US008865094B2

(12) United States Patent
Luo et al.

(10) Patent No.: US 8,865,094 B2
(45) Date of Patent: Oct. 21, 2014

(54) METHODS FOR SEPARATING MEDICAL ISOTOPES USING IONIC LIQUIDS

(75) Inventors: Huimin Luo, Knoxville, TN (US); Rose Ann Boll, Knoxville, TN (US); Jason Richard Bell, Midlothian, VA (US); Sheng Dai, Knoxville, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 112 days.

(21) Appl. No.: 13/614,757

(22) Filed: Sep. 13, 2012

(65) Prior Publication Data

US 2014/0072485 A1    Mar. 13, 2014

(51) Int. Cl.
*C22B 60/00*    (2006.01)

(52) U.S. Cl.
USPC ............... 423/2; 423/3; 423/6; 423/8; 423/9; 423/10

(58) Field of Classification Search
None
See application file for complete search history.

(56) References Cited

U.S. PATENT DOCUMENTS

| 7,851,496 | B2 | 12/2010 | Park et al. |
|---|---|---|---|
| 8,129,543 | B2 | 3/2012 | Kawada et al. |
| 2006/0147532 | A1 | 7/2006 | Ausborn et al. |
| 2010/0261945 | A1 | 10/2010 | Lim et al. |
| 2011/0065926 | A1 | 3/2011 | Maase et al. |

FOREIGN PATENT DOCUMENTS

JP    2009-36617    2/2009

OTHER PUBLICATIONS

Nakashima K. et al., "Feasibility of Ionic Liquids as Alternative Separation Media for Industrial Solvent Extraction Processes", *Ind. Eng. Chem. Res.* 44:4368-4372 (2005).
Luo H. et al., "Solvent Extraction of $Sr^{2+}$ and $Cs^+$ Based on Room-Temperature Ionic Liquids Containing Monoaza-Substituted Crown Ethers", *Anal. Chem.* 76:2773-2779 (2004).
Dietz M.L. et al., "Ion-Exchange as a Mode of Cation Transfer into Room-Temperature Ionic Liquids Containing Crown Ethers: Implications for the 'Greenness' of Ionic Liquids as Diluents in Liquid-Liquid Extraction", *ChemComm Communication*, pp. 2124-2125 (2001).
Visser A.E. et al., "Task-Specific Ionic Liquids for the Extraction of Metal Ions from Aqueous Solutions", *Chem. Commun.* pp. 135-136 (2001).
Dai S. et al., "Solvent Extraction of Strontium Nitrate by a Crown Ether Using Room-Temperature Ionic Liquids", *J. Chem. Soc., Dalton Trans.* pp. 1201-1202 (1999).
Boll R.A. et al., "Optimizations of Radiolabeling of Immunoproteins With $^{213}$Bi", *Radiochimica Acta* 79:145-149 (1997).
McDevitt M.R. et al., "An $^{225}$Ac/$^{213}$Bi Generator System for Therapeutic Clinical Applications: Construction and Operation", *Applied Radiation and Isotopes* 50:895-904 (1999).
Wu C. et al., "An Improved Generator for the Production of $^{213}$Bi from $^{225}$Ac", *Radiochimica Acta* 79:141-144 (1997).
Kan H-C et al., "Bicyclic Imidazolium-Based Ionic Liquids: Synthesis and Characterization", *Tetrahedron* 63:1644-1653 (2007).
Greaves T.L. et al., "Protic Ionic Liquids: Properties and Applications", *Chem Rev.* 108:206-237 (2008).
Bogdanov M.G. et al., "New Guanidinum-Based Room-Temperature Ionic Liquids. Substituent and Anion Effect on Density and Solubility in Water", *Z. Naturforsch* 65b:37-48 (2010).
Xu C. et al., "Efficient Removal of Caesium Ions from Aqueous Solution Using a Calix Crown Ether in Ionic Liquids: Mechanism and Radiation Effect", *Dalton Transactions* 39:3897-3902 (2010).
Binnemans K., "Lanthanides and Actinides in Ionic Liquids", *Chem. Rev.* 107:2592-2614 (2007).
Kimura T. et al., "Recent Activities on Aqueous Partitioning at JAEA", *Actinide and Fission Product Partitioning & Transmutation, 9th Information Exchange Meeting*, Nimes, France 23 pages (Sep. 27, 2006).
Luo H., "A Striking Effect of Ionic-Liquid Anions in the Extraction of $Sr^{2+}$ and $Cs^+$ by Dicyclohexano-18-Crown-6", *Solvent Extraction and Ion Exchange* 24:19-31 (2006).
Kubota F. et al., "Application of Ionic Liquids to Solvent Extraction", *Solvent Extraction Research and Development* 13:23-36 (2006).

*Primary Examiner* — Steven Bos
(74) *Attorney, Agent, or Firm* — Scully, Scott, Murphy & Presser, P.C.

(57) ABSTRACT

A method for extracting a radioisotope from an aqueous solution, the method comprising: a) intimately mixing a non-chelating ionic liquid with the aqueous solution to transfer at least a portion of said radioisotope to said non-chelating ionic liquid; and b) separating the non-chelating ionic liquid from the aqueous solution. In preferred embodiments, the method achieves an extraction efficiency of at least 80%, or a separation factor of at least $1\times10^4$ when more than one radioisotope is included in the aqueous solution. In particular embodiments, the method is applied to the separation of medical isotopes pairs, such as Th from Ac (Th-229/Ac-225, Ac-227/Th-227), or Ra from Ac (Ac-225 and Ra-225, Ac-227 and Ra-223), or Ra from Th (Th-227 and Ra-223, Th-229 and Ra-225).

31 Claims, 4 Drawing Sheets

METHODS FOR SEPARATING MEDICAL ISOTOPES USING IONIC LIQUIDS

This invention was made with government support under Prime Contract No. DE-AC05-00OR22725 awarded by the U.S. Department of Energy. The government has certain rights in the invention.

FIELD OF THE INVENTION

The present invention relates generally to methods for extracting and separating radioisotopes, and more particularly, to extracting and separating such radioisotopes from aqueous solution, particularly where the radioisotopes are medical radioisotopes.

BACKGROUND OF THE INVENTION

The daughters of Th-229 (Ac-225 and Bi-213) and other alpha-emitting radioisotopes are rapidly becoming of great interest for short range and site-specific therapy of cancers and micrometastatic disease. Pre-clinical and Phase I clinical trials involving Bi-213 are underway throughout the world focusing on treatment of acute myelogenous leukemia, prostate cancer, multiple myeloma, non-Hodgkin lymphoma, colon cancer, and other diseases (Jurcic, J. G., et al., "Targeted Alpha-Particle Immunotherapy for Myeloid Leukemia," *Blood*, 100, pp. 1233-1239, 2002). Success in one or more of these trials will greatly increase demand for alpha-emitting radioisotopes and will necessitate improved methods for delivering the isotopes at clinics.

In many of the current generator systems, the production process uses an organic exchange resin. Radiolytic breakdown of these generators limits their size to a few mCi and their useful lifetime to a few days (Boll, R. A., et al., "Optimizations of Radiolabeling of Immunoproteins with Bi-213," *Radiochimica Acta*, 79, pp. 145-149, 1997). Generators with loadings of up to 25 mCi have been prepared by distributing the activity throughout the resin. With this approach, shelf life of generators has been extended to a week (McDevitt, M. R., et al., "An Ac-225/Bi-213 Generator System for Therapeutic Clinical Applications: Construction and Operation," *Appl. Radiat. Isot.*, 50, pp. 895-904, 1999). The use of silica-based extraction chromatographic resin showed some resistance to damage by alpha-radiolysis when in combination with a broad distribution of the Ac-225 on the resin (Wu, C., et al., "An Improved Generator for the Production of Bi-213 from Ac-225" *Radiochimica Acta*, 79, 141-144 (1997).

For clinical applications, generators containing 60 mCi or more are typically required. However, a decrease in the performance of the resin-based Ac-225/Bi213 generators at these higher levels of radioactivity tends to occur due to radiolytic breakdown of the resins in a high radiation field. In turn, radiolytic breakdown generally results in: (1) lower yields of Bi-213, (2) undesirable higher Ac-225 breakthrough, and (3) extra processing time for purification of the Bi-213 product for incorporation into radiopharmaceutics.

SUMMARY OF THE INVENTION

The invention is directed to methods for extracting a radioisotope from an aqueous solution using a non-chelating ionic liquid as the extractant. The invention is particularly directed to methods for separating one radioisotope from another radioisotope in an aqueous solution containing a mixture of radioisotopes.

In particular embodiments, the method for extracting a radioisotope from an aqueous solution includes the following steps: a) intimately mixing a non-chelating ionic liquid with the aqueous solution to transfer at least a portion of the radioisotope to the non-chelating ionic liquid; and b) separating the non-chelating ionic liquid from the aqueous solution. In preferred embodiments, the method achieves an extraction efficiency of at least 80% or 90%, wherein the extraction efficiency is calculated as $R_{IL}/(R_{IL}+R_{aq})$, wherein $R_{IL}$ represents a final radioactivity of the radioisotope in the ionic liquid, and $R_{aq}$ represents a final radioactivity of the radioisotope in the aqueous solution in the same units of radioactivity, wherein the final radioactivity is the radioactivity measured after steps (a) and (b) are completed.

In the case where the aqueous solution contains more than one radioisotope, the above extraction method can advantageously be used to substantially separate a first radioisotope from a second radioisotope by disproportionately extracting the first radioisotope over the second radioisotope. In preferred embodiments, the method achieves a separation factor of at least $1 \times 10^4$ or at least $1 \times 10^5$ wherein the separation factor is calculated as $D_1/D_2$, wherein $D_1$ is a distribution coefficient for the first radioisotope and $D_2$ is a distribution coefficient for the second radioisotope. The distribution coefficient is calculated by the general formula $R_{IL}/R_{aq} \times \text{Vol}_{aq}/\text{Vol}_{IL}$, wherein $R_{IL}$ represents a final radioactivity of the radioisotope in the ionic liquid, $R_{aq}$ represents a final radioactivity of the radioisotope in the aqueous solution in the same units of radioactivity, $\text{Vol}_{IL}$ represents a volume of the ionic liquid, and $\text{Vol}_{aq}$ represents a volume of the aqueous solution.

The ionic liquids used in the instant invention advantageously offer numerous potential benefits compared to typical organic solvents, such as non-volatility, non-flammability, a broad temperature range of stability, the ability to dissolve both inorganic and organic compounds, high conductivity, and wide electrochemical windows. Moreover, the unique ionicity and ion-exchange capability of ionic liquids have herein been found to offer ideal solvation environments for separation of ionic metal species, thus leading to very high extraction efficiencies. The key advantage of the extraction systems based on ionic liquids lies in the synergistic role played by ionic liquids in the extraction process. The ionic liquids not only function as diluents but may also be intimately involved in separation processes by ion-exchange mechanisms and unique solvation interactions. This bifunctionality associated with ionic liquid solvents is seldom found for conventional solvents, and thus, advantageously opens up another avenue for tuning the extraction properties of a specific extractant. Accordingly, by methodical solvent design and judicious selection of processing conditions, the instant invention exploits the numerous benefits of ionic liquids to enhance extraction and separation of radioisotopes.

As the method is particularly directed to medical radioisotopes, the instant invention provides a significant benefit to the medical arts. The invention is particularly directed to the separation of thorium from actinium (Th-229/Ac-225, Ac-227/Th-227), radium from actinium (Ac-225 and Ra-225, Ac-227 and Ra-223), and radium from thorium (Th-227 and Ra-223, Th-229 and Ra-225).

DETAILED DESCRIPTION OF THE INVENTION

Figure 1:
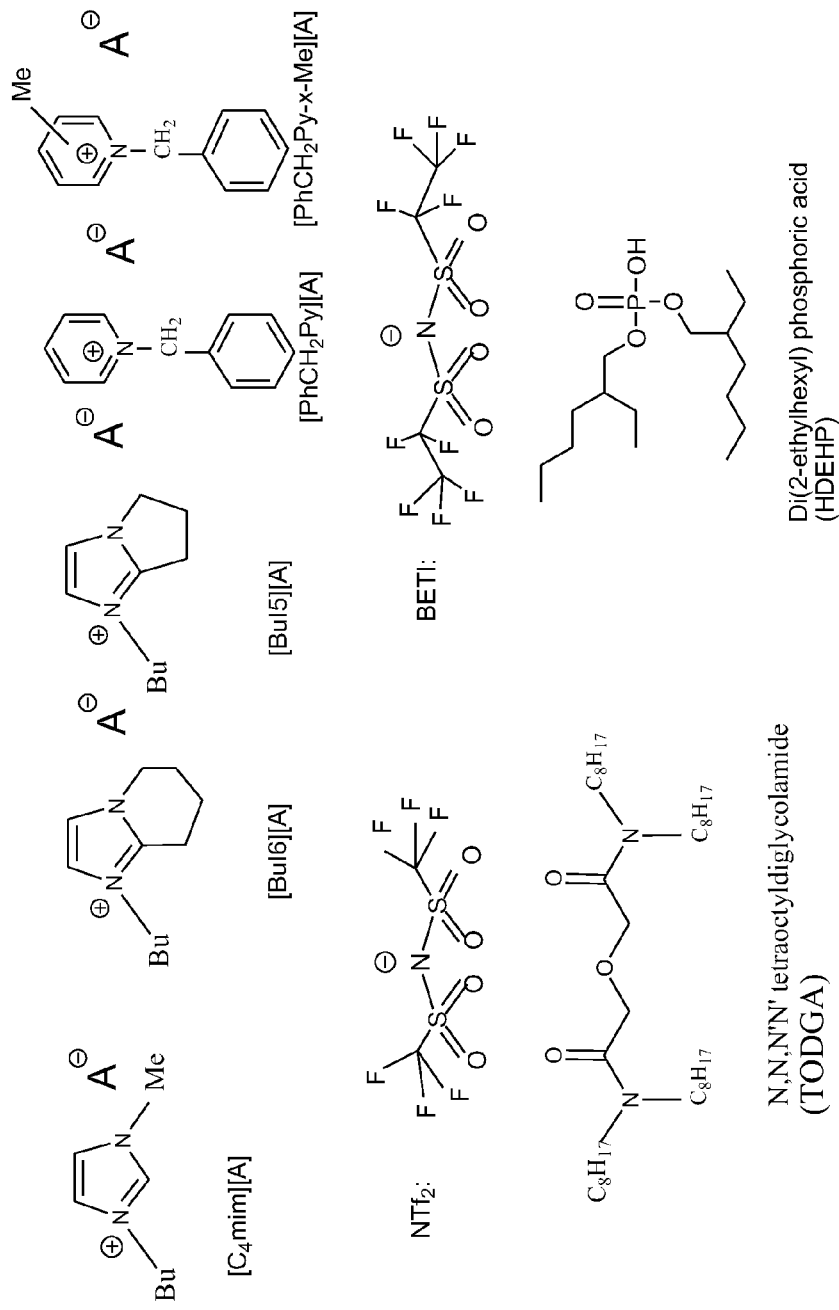
FIG. 1. Molecular structures of selected ionic liquids, anions, and extractants, wherein A⁻ denotes an anion equivalent in scope to X⁻ described elsewhere herein.

As used herein, the term "about" generally indicates within ±0.5%, 1%, 2%, 5%, or up to ±10% of the indicated value. For example, a temperature of about 25° C. generally indicates, in its broadest sense, 25° C.±10%, which indicates 22.5-27.5° C.

In the method, one or more radioisotopes are extracted from an aqueous solution by intimately mixing the aqueous solution holding the one or more radioisotopes (i.e., "aqueous substrate") with one or more non-chelating ionic liquids (i.e., "ionic liquid" or "IL") to transfer the one or more radioisotopes to the ionic liquid from the aqueous substrate, and then separating the ionic liquid from the aqueous substrate. The intimate mixing should ensure the maximum extraction ability for the ionic liquid being used under the conditions (e.g., temperature and pressure) being used. The ionic liquid and aqueous substrate can be intimately mixed by any of the methods known in the art, such as by manual or mechanical stirring, vibrating, shaking, or tumbling. In some embodiments, high-speed stirring by use of a high-speed mixer is used. The high-speed mixer may provide stirring at, for example, 100, 200, 500, 1000, 1500, or 2000 revolutions per minute (rpm), or up to, below, at least, or above any of the foregoing rpm values. Any suitable temperature, typically up to 100° C., can be employed during the mixing step. In different embodiments, a temperature of about, at least, above, up to, or less than, for example, 20, 30, 40, 50, 60, 70, 80, 90, or 100° C. may be employed. Typically, the mixing step is conducted at standard pressure (approximately 1 atm); however, in some embodiments, an elevated pressure may be used, such as a pressure of about or at least, for example, 1.5, 2, 2.5, 3, 4, 5, or 10 atm, or a reduced pressure may be used, such as up to or below, 1, 0.8, 0.5, or 0.1 atm.

After intimate mixing of the ionic liquid and aqueous substrate, the ionic liquid is separated from the aqueous substrate. The ionic liquid can be separated from the aqueous substrate by any of the means known in the art. In one embodiment, the ionic liquid and aqueous substrate combination is allowed to stand over a period of time until sufficient separation of the two phases is observed. The standing period is typically at least 1, 2, 3, or 4 hours and up to 6, 8, 12, 18, 24, 36, or 48 hours. In another embodiment, the ionic liquid and aqueous substrate combination is centrifuged to facilitate or effect separation. The centrifugation can be conducted at any suitable angular velocity, such as an angular velocity of about, at least, above, up to, or below 1000, 2000, 5000, 10,000, 15,000, 20,000, 25,000, or 30,000, or any angular velocity within a range bounded by any two of these values. In another embodiment, the ionic liquid and aqueous substrate combination is cooled down to a sufficient temperature to facilitate or effect separation. The ionic liquid and aqueous substrate combination can be cooled down to a temperature of about or below, for example, 20, 15, 10, 0, −10, −20, −30° C. If an elevated temperature, such as 30, 40, or 50° C., is used during the mixing step, the cool down temperature may be above 20° C. if that temperature can effect separation. In yet another embodiment, a phase-separation facilitator is added to the ionic liquid and aqueous substrate combination to effect phase separation. For example, a sufficiently hydrophobic molecule, which may be a non-polar solvent, may be added to the combination, with the result that the hydrophobic molecule mixes selectively with the ionic liquid phase to render the ionic liquid phase sufficiently hydrophobic to separate from the aqueous substrate. Alternatively, a highly polar molecule, such as a salt, may be added to the combination with the result that the highly polar molecule mixes selectively with the aqueous phase to render the aqueous phase sufficiently hydrophilic to separate from the ionic liquid. The ionic liquid is also preferably selected so that it is sufficiently hydrophobic, by itself, to separate from the aqueous substrate. In still other embodiments, the separation step is effected by employing a combination of any two or more of the above techniques. For example, the separation step may be effected by centrifuging the combination and allowing the combination to stand, or the separation may be effected by cooling the combination and allowing the combination to stand, or the separation may be effected by including a phase-separation facilitator followed by standing and/or centrifugation. Typically, the pressure employed during the separation step is standard pressure; however, any of the pressures described above for the mixing step may also be employed.

In some embodiments, the pH of the aqueous substrate is adjusted prior to or during mixing with the ionic liquid. The pH of the aqueous substrate, among other variables, may have a significant impact on the extraction efficiency or separation factor of the process. In different embodiments, the aqueous substrate may be adjusted to have a pH of about, at least, above, up to, or less than, for example, 1, 2, 3, 4, 5, 6, 7, 8, 9, or 10. Alternatively, the pH can be specified in terms of normality, such as 0.00001N, 0.0001N, 0.001N, 0.01N, 0.1N, 0.2 N, 0.5N, or 1N, or a range of normalities bounded therebetween. The aqueous substrate can be adjusted in pH by addition thereto of an acid or base, as appropriate, wherein the acid or base can be any of the acids or bases known in the art and which do not have an adverse impact on the method.

The radioisotope considered herein is any radioisotope that can dissolve in water, particularly those radioisotopes used in the medical profession for therapeutic treatment or medical imaging (e.g., PET or SPECT) of patients. Generally, the radioisotopes considered herein are those that have a half-life of at least 1, 2, 5, 10, 25, 40, or 50 days. In some embodiments, the radioisotopes have a half life of not more than 1, 2, 5, 10, 25, 50, 100, or 200 days, or not more than 1, 2, 5, or 10 years. In different embodiments, the radioisotope has an atomic number of at least or above 3, 5, 11, 13, 19, 37, 49, 55, 80, 87, 88, 89, or 90, or an atomic number within a range bounded by any two of the foregoing values. Some examples of radioisotopes include the radionuclides of technetium (e.g., Tc-99 and Tc-97), potassium (e.g., K-40), rubidium (Rb-82), iodine (e.g., I-123, I-124, I-125, I-129, I-131), cesium (e.g., Cs-135, Cs-137), cobalt (e.g., Co-60), palladium (e.g., Pd-103, Pd-107), cadmium (e.g., Cd-113), strontium (e.g., Sr-89, Sr-90), europium (e.g., Eu-55), tin (Sn-121, Sn-126), phosphorus (e.g., P-32, P-33), thallium (e.g., Tl-201), indium (e.g., In-111), gallium (e.g., Ga-67, Ga-68), yttrium (e.g., Y-90), iridium (e.g., Ir-192), bismuth (e.g., Bi-213), radium (Ra-223, Ra-225), and ruthenium (Ru-106). In the case where the method involves a separation of radioisotopes, the two radioisotopes are typically related as parent and daughter nuclides, such as thorium and actinium. In some embodiments, any one or more of the above-described classes or specific types of radioisotopes are excluded from the method.

In particular embodiments, the radioisotope is selected from a lanthanide (i.e., an element having an atomic number of 58 to 71) and/or an actinide (i.e., an element having an atomic number of 89 to 103) or to a subset of elements therein.

Some examples of lanthanide elements include lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), and lutetium (Lu). Some examples of actinide elements include actinium (Ac), thorium (Th), and protactinium (Pa). In some embodiments, any one or more of the foregoing radioisotopes are excluded from the method.

In the extraction, at least a portion of the radioisotope is transferred from the aqueous substrate to the ionic liquid. The efficiency of the extraction (i.e., extraction efficiency) of the one or more radioisotopes from the aqueous solution to the ionic liquid can be conveniently calculated according to the formula $R_{IL}/(R_{IL}+R_{aq})$, wherein $R_{IL}$ represents a final radioactivity of the radioisotope in the ionic liquid, and $R_{aq}$ represents a final radioactivity of the radioisotope in the aqueous solution in the same units of radioactivity, wherein the final radioactivity is the radioactivity measured after steps (a) and (b) are completed. The extraction efficiency is preferably at least 50%, 60%, 70%, 75%, 80%, 85%, 90%, 95%, 97%, 98%, 99%, or even 100%.

In embodiments where the extraction functions to substantially separate a first radioisotope from another radioisotope, the efficiency of the separation can be conveniently calculated by the formula $D_1/D_2$ (the separation factor), wherein $D_1$ is a distribution coefficient for the first radioisotope and $D_2$ is a distribution coefficient for the second radioisotope, wherein the distribution coefficient is calculated by the general formula $R_{IL}/R_{aq} \times Vol_{aq}/Vol_{IL}$, wherein $R_{IL}$ represents a final radioactivity of the radioisotope in the ionic liquid, $R_{aq}$ represents a final radioactivity of the radioisotope in the aqueous solution in the same units of radioactivity, $Vol_{IL}$ represents a volume of the ionic liquid, and $Vol_{aq}$ represents a volume of the aqueous solution. The separation factor is preferably at least $1\times10^2$, $1\times10^3$, $1\times10^4$, $1\times10^5$, or $1\times10^6$.

The ionic liquid considered herein is any ionic liquid that does not chelate to the metal being extracted, i.e., the ionic liquid is non-chelating. The ionic liquid should also be capable of separating from the aqueous substrate by any suitable means after being intimately mixed with the aqueous substrate. In particular embodiments, the ionic liquid possesses sufficient hydrophobicity to the extent that it does not dissolve into the aqueous substrate, or the ionic liquid may partially or completely dissolve in the aqueous substrate under certain conditions but is capable of separating from the aqueous substrate under other conditions. The ionic liquid should also be substantially radiation stable.

As understood in the art, an ionic liquid includes a cationic component and an anionic (counteranionic or counterion) component. By being non-chelating, the ionic liquid does not include a portion that functions to chelate the metal being extracted, or the ionic liquid does not include a chelating portion altogether. A chelating portion, as understood in the art, is a portion of a molecule that can form at least two coordinate bonds with a metal, such as provided by a polydentate ligand, such as ethylenediamine, bipyridine, a crown ether, porphyrinate, or salen, all of which may be excluded from the non-chelating ionic liquid described herein. Some examples of chelating portions that are preferably excluded from the ionic liquid include cyclic polyethers (e.g., crown ethers), polyamines (e.g., ethylenediamines and diethylenetriamines), porphyrin structures, polycarboxylates, polythiols, polythioethers, and combinations thereof (e.g., EDTA). The chelating portions to be excluded are generally uncharged (i.e., neutral) or may be negatively charged.

The ionic liquid is typically a liquid at room temperature (e.g., 15, 18, 20, 22, 25, or 30° C.) or lower. However, in some embodiments, the ionic liquid may become a liquid at a higher temperature than 30° C. if the process is conducted at an elevated water temperature (i.e., up to the boiling point of water, or 100° C.) that melts the ionic liquid. Thus, in some embodiments, the ionic liquid may have a melting point of up to or less than 100, 90, 80, 70, 60, 50, 40, or 30° C. In other embodiments, the ionic liquid is a liquid at or below 10, 5, 0, −10, −20, −30, or −40° C.

The density of the ionic liquid is generally above 1.2 g/mL at an operating temperature of interest, and particularly at a temperature within 20-30° C. In different embodiments, the density of the ionic liquid can be at least 1.2, 1.3, 1.4, 1.5, 1.6, 1.7, or 1.8 g/mL, or a particular range bounded by any two of these values.

The viscosity of the ionic liquid is typically no more than 50,000 centipoise (50,000 cP) at an operating temperature of interest, and particularly at a temperature within 20-30° C. More typically, the viscosity of the ionic liquid is no more than about 25,000 cP, 10,000 cP, 5,000 cP, 2,000 cP, 1,000 cP, 800 cP, 700 cP, 600 cP, 500 cP, 400 cP, 300 cP, 200 cP, 100 cP, or 50 cP.

The ionic liquids considered herein also preferably possess a suitable degree of thermal resilience, as typically reflected by the onset decomposition temperature, to ensure their stability for use in the applications described herein. In different embodiments, the ionic liquid preferably exhibits an onset decomposition temperature of at least 100, 150, 200, 250, 300, 350, 400, 450, 500, 525, 550, 575, or 600° C.

The ionic liquid compositions used herein can be conveniently described by the formula $(Y^+)(X^-)$, wherein $Y^+$ is a cationic component of the ionic liquid and $X^-$ is an anionic component of the ionic liquid. The formula $(Y^+)(X^-)$ is meant to encompass a cationic component $(Y^+)$ having any valency of positive charge, and an anionic component $(X^-)$ having any valency of negative charge, provided that the charge contributions from the cationic portion and anionic portion are counterbalanced in order for charge neutrality to be preserved in the ionic liquid molecule. More specifically, the formula $(Y^+)(X^-)$ is meant to encompass the more generic formula $(Y^{+a})_y(X^{-b})_x$, wherein the variables a and b are, independently, non-zero integers, and the subscript variables x and y are, independently, non-zero integers, such that a.y=b.x (wherein the period placed between variables indicates multiplication of the variables). The foregoing generic formula encompasses numerous possible sub-formulas, such as, for example, $(Y^+)(X^-)$, $(Y^{+2})(X^-)_2$, $(Y^+)_2(X^{-2})$, $(Y^{+2})_2(X^{-2})_2$, $(Y^{+3})(X^-)_3$, $(Y^+)_3(X^{-3})$, $(Y^{+3})_2(X^{-2})_3$, and $(Y^{+2})_3(X^{-3})_2$. For simplicity, numerous embodiments of ionic liquids, described below, designate the anion as $X^-$, which in its strict sense indicates a monovalent anion. However, the anion designated as $X^-$ is meant to encompass an anion of any valency, such as any of the valencies described above and further below, unless otherwise specified.

In one set of embodiments, the ionic liquid possesses an ammonium cation portion. In a first embodiment, the ammonium cation portion includes a heterocyclic ring having a positively-charged ring nitrogen atom. The heterocyclic ring having a positively-charged ring nitrogen atom can be monocyclic, bicyclic, tricyclic, or a higher cyclic (polycyclic) ring system. Some examples of a heterocyclic ring having a positively-charged ring nitrogen atom include imidazolium, pyridinium, pyrazinium, pyrrolidinium, piperidinium, piperazinium, morpholinium, pyrrolium, pyrazolium, pyrimidinium, triazolium, oxazolium, thiazolium, triazinium, and cyclic guanidinium rings. Any of the foregoing cationic rings may be bound or fused with one or more other saturated or unsaturated (e.g., aromatic) rings, such as a benzene, cyclohexane, cyclohexene, pyridine, pyrazine, pyrrolidine, piperidine, piperazine, pyrrole, pyrazole, pyrimidine, or indole rings. Some examples of fused charged rings include benzimidazolium, pyrrolo[1,2-a]pyrimidinium, indolium, quinolinium, quinazolinium, quinoxalinium, 5,6,7,8-tetrahydroimidazo[1,2-a]pyridine, and H-imidazo[1,2-a]pyridine. Any of the foregoing cationic rings may be substituted by one or more hydrocarbon groups (R) as further described below. Typically, at least one ring nitrogen atom is substituted with a hydrocarbon group (R) to provide the positive charge. Ionic liquids containing any of the foregoing cationic components are either commercially available or can be synthesized by procedures well-known in the art, as evidenced by, for example, T. L. Greaves, et al., "Protic Ionic Liquids: Properties and Applications", *Chem. Rev.,* 108, pp. 206-237 (2008), the contents of which are herein incorporated by reference in their entirety. Any of the ionic liquids described in the foregoing reference may be used herein.

In one embodiment, the ammonium ionic liquid is an imidazolium-based ionic liquid having a structure of the general formula:

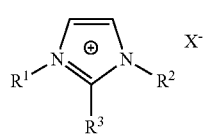

(1)

In Formula (1) above, $R^1$, $R^2$ and $R^3$ are each independently a saturated or unsaturated, straight-chained, branched, or cyclic hydrocarbon group (R), as further described below, having at least one carbon atom, and $X^-$ is a counteranion, as further described infra. In some embodiments, $R^1$ and $R^2$, or $R^1$ and $R^3$, or $R^1$ and $R^3$ are different in structure or number of carbon atoms, whereas in other embodiments, $R^1$ and $R^2$, or $R^1$ and $R^3$, or $R^2$ and $R^3$ are the same either in structure or number of carbon atoms. In different embodiments, $R^1$, $R^2$ and $R^3$ each independently have a minimum of at least one, two, three, four, five, six, seven, or eight carbon atoms. In other embodiments, $R^1$, $R^2$ and $R^3$ each independently have a maximum of two, three, four, five, six, seven, eight, nine, ten, eleven, twelve, thirteen, fourteen, fifteen, sixteen, seventeen, or eighteen carbon atoms. In other embodiments, $R^1$, $R^2$ and $R^3$ independently have a number of carbon atoms within a range of carbon atoms bounded by any of the exemplary minimum and maximum carbon numbers provided above. As the double bonds shown in Formula (1) are generally delocalized, other structurally equivalent depictions may be possible for the imidazolium ring.

In a first embodiment, one, two, or all of $R^1$, $R^2$ and $R^3$ are saturated and straight-chained hydrocarbon groups (i.e., straight-chained alkyl groups). Some examples of straight-chained alkyl groups include methyl, ethyl, n-propyl, n-butyl, n-pentyl, n-hexyl, n-heptyl, n-octyl, n-nonyl, n-decyl, n-undecyl, n-dodecyl, n-tridecyl, n-tetradecyl, n-pentadecyl, n-hexadecyl, n-heptadecyl, and n-octadecyl groups.

In a second embodiment, one, two, or all of $R^1$, $R^2$ and $R^3$ are saturated and branched hydrocarbon groups (i.e., branched alkyl groups). Some examples of branched alkyl groups include isopropyl, isobutyl, sec-butyl, t-butyl, isopentyl, neopentyl, 2-methylpentyl, 3-methylpentyl, and the numerous $C_7$, $C_8$, $C_9$, $C_{10}$, $C_{11}$, $C_{12}$, $C_{13}$, $C_{14}$, $C_{15}$, $C_{16}$, $C_{17}$, and $C_{18}$ saturated and branched hydrocarbon groups.

In a third embodiment, one, two, or all of $R^1$, $R^2$ and $R^3$ are saturated and cyclic hydrocarbon groups (i.e., cycloalkyl groups). Some examples of cycloalkyl groups include cyclopropyl, cyclobutyl, cyclopentyl, cyclohexyl, cycloheptyl, cyclooctyl, and their methyl-, ethyl-, and propyl-substituted derivatives and/or their methylene, dimethylene, trimethylene, and tetramethylene cross-linked derivatives (as crosslinked to a nitrogen atom of the imidazolium ring). The cycloalkyl group can also be a polycyclic (e.g., bicyclic or tricyclic) group by either possessing a bond between two of the ring groups (e.g., dicyclohexyl) or a shared (i.e., fused) side (e.g., decalin and norbornane).

In a fourth embodiment, one, two, or all of $R^1$, $R^2$ and $R^3$ are unsaturated and straight-chained hydrocarbon groups (i.e., straight-chained olefinic or alkenyl groups). Some examples of straight-chained olefinic groups include vinyl, 2-propen-1-yl, 3-buten-1-yl, 2-buten-1-yl, butadienyl, 4-penten-1-yl, 3-penten-1-yl, 2-penten-1-yl, 2,4-pentadien-1-yl, 5-hexen-1-yl, 4-hexen-1-yl, 3-hexen-1-yl, 3,5-hexadien-1-yl, 1,3,5-hexatrien-1-yl, 6-hepten-1-yl, ethynyl, propargyl, and the numerous $C_7$, $C_8$, $C_9$, $C_{10}$, $C_{11}$, $C_{12}$, $C_{13}$, $C_{14}$, $C_{15}$, $C_{16}$, $C_{17}$, and $C_{18}$ unsaturated and straight-chained hydrocarbon groups.

In a fifth embodiment, one, two, or all of $R^1$, $R^2$ and $R^3$ are unsaturated and branched hydrocarbon groups (i.e., branched olefinic or alkenyl groups). Some branched olefinic groups include 2-propen-2-yl, 3-buten-2-yl, 3-buten-3-yl, 4-penten-2-yl, 4-penten-3-yl, 3-penten-2-yl, 3-penten-3-yl, 2,4-pentadien-3-yl, and the numerous $C_6$, $C_7$, $C_8$, $C_9$, $C_{10}$, $C_{11}$, $C_{12}$, $C_{13}$, $C_{14}$, $C_{15}$, $C_{16}$, $C_{17}$, and $C_{18}$ unsaturated and branched hydrocarbon groups.

In a sixth embodiment, one, two, or all of $R^1$, $R^2$ and $R^3$ are unsaturated and cyclic hydrocarbon groups. Some examples of unsaturated and cyclic hydrocarbon groups include cyclopropenyl, cyclobutenyl, cyclopentenyl, cyclopentadienyl, cyclohexenyl, cyclohexadienyl, phenyl, benzyl, cycloheptenyl, cycloheptadienyl, cyclooctenyl, cyclooctadienyl, cyclooctatetraenyl, and their methyl-, ethyl-, and propyl-substituted derivatives and/or their methylene, dimethylene, trimethylene, and tetramethylene cross-linked derivatives (as crosslinked to a nitrogen atom of the imidazolium ring). The unsaturated cyclic hydrocarbon group can also be a polycyclic (e.g., bicyclic or tricyclic) group by either possessing a bond between two of the ring groups (e.g., biphenyl) or a shared (i.e., fused) side (e.g., naphthalene, anthracene, and phenanthrene).

In one embodiment, as in the examples above, one or more of the hydrocarbon groups (R), described above, are composed solely of carbon and hydrogen, i.e., do not include one or more heteroatoms, such as oxygen or nitrogen atoms. In another embodiment, one or more of the hydrocarbon groups include one or more heteroatoms, such as one or more oxygen, nitrogen, and/or fluorine atoms. Some examples of oxygen-containing hydrocarbon groups include those possessing one or more hydroxyl (OH) groups, alkoxide (—OR), carbonyl groups (e.g., ketone, ester, amide, or urea functionalities), amino (e.g., —$NH_2$, —NHR, and —$NR_2$), imino (e.g., =N—, =N—H or =N—R groups), and/or carbon-oxygen-carbon (ether) groups. In a particular embodiment, the oxygen-containing hydrocarbon group includes two or more ether groups, such as a polyalkyleneoxide group, such as a polyethyleneoxide group. Some examples of nitrogen-containing hydrocarbon groups include those possessing one or more primary amine groups, secondary amine groups, tertiary amine groups, and/or quaternary amine groups, wherein it is understood that a quaternary amine group necessarily possesses a positive charge and requires a counteranion. Some examples of fluorine-containing hydrocarbon groups (i.e., fluorocarbon groups) include the partially-substituted varieties (e.g., fluoromethyl, difluoromethyl, 2-fluoroethyl, 2,2-difluoroethyl, 2,2,2-trifluoroethyl, and the like) and perfluoro-substituted varieties (e.g., perfluoromethyl, perfluoroethyl, perfluoropropyl, perfluorobutyl, and the like). In some embodiments, any one or more of the foregoing exemplary heteroatoms or heteroatom-containing substituents may be excluded from Formula (1) or from any of the cationic and/or anionic portions of the ionic liquids described herein.

The ionic liquids according to Formula (1) can contain any of the above-described imidazolium-based cationic components associated (i.e., complexed) with counteranions $X^-$ further described infra. Some general examples of imidazolium-based ionic liquids according to Formula (1) include 1,3-dimethylimidazolium$^+$X$^-$, 1,2,3-trimethylimidazolium$^+$X$^-$, 2-ethyl-1,3-dimethylimidazolium$^+$X$^-$, 2-n-propyl-1,3-dimethylimidazolium$^+$X$^-$, 2-n-butyl-1,3-dimethylimidazolium$^+$X$^-$, 1-ethyl-2,3-dimethylimidazolium$^+$X$^-$, 1-n-propyl-2,3-dimethylimidazolium$^+$X$^-$, 1-n-butyl-2,3-dimethylimidazolium$^+$X$^-$, 1-methyl-3-ethylimidazolium$^+$X$^-$, 1-methyl-3-n-propylimidazolium$^+$X$^-$, 1-methyl-3-isopropylimidazolium$^+$X$^-$, 1-methyl-3-n-butylimidazolium$^+$X$^-$ (i.e., BMIM$^+$X$^-$), 1-methyl-3-isobutylimidazolium$^+$X$^-$, 1-methyl-3-sec-butylimidazolium$^+$X$^-$, 1-methyl-3-t-butylimidazolium$^+$X$^-$, 1,3-diethylimidazolium$^+$X$^-$, 1-ethyl-3-n-propylimidazolium$^+$X$^-$, 1-ethyl-3-isopropylimidazolium$^+$X$^-$, 1-ethyl-3-n-butylimidazolium$^+$X$^-$, 1-ethyl-3-isobutylimidazolium$^+$X$^-$, 1-ethyl-3-sec-butylimidazolium$^+$X$^-$, 1-ethyl-3-t-butylimidazolium$^+$X$^-$, 1,3-di-n-propylimidazolium$^+$X$^-$, 1-n-propyl-3-isopropylimidazolium$^+$X$^-$, 1-n-propyl-3-n-butylimidazolium$^+$X$^-$, 1-n-propyl-3-isobutylimidazolium$^+$X$^-$, 1-n-propyl-3-sec-butylimidazolium$^+$X$^-$, 1-n-propyl-3-t-butylimidazolium$^+$X$^-$, 1,3-diisopropylimidazolium$^+$X$^-$, 1-isopropyl-3-n-butylimidazolium$^+$X$^-$, 1-isopropyl-3-isobutylimidazolium$^+$X$^-$, 1-isopropyl-3-sec-butylimidazolium$^+$X$^-$, 1-isopropyl-3-t-butylimidazolium$^+$X$^-$, 1,3-di-n-butylimidazolium$^+$X$^-$, 1-n-butyl-3-isobutylimidazolium$^+$X$^-$, 1-n-butyl-3-sec-butylimidazolium$^+$X$^-$, 1-n-butyl-3-t-butylimidazolium$^+$X$^-$, 1,3-diisobutylimidazolium$^+$X$^-$, 1-isobutyl-3-sec-butylimidazolium$^+$X$^-$, 1-isobutyl-3-t-butylimidazolium$^+$X$^-$, 1,3-di-sec-butylimidazolium$^+$X$^-$, 1-sec-butyl-3-t-butylimidazolium$^+$X$^-$, 1,3-di-t-butylimidazolium$^+$X$^-$, 1-methyl-3-pentylimidazolium$^+$X$^-$, 1-methyl-3-hexylimidazolium$^+$X$^-$, 1-methyl-3-heptylimidazolium$^+$X$^-$, 1-methyl-3-octylimidazolium$^+$X$^-$, 1-methyl-3-decylimidazolium$^+$X$^-$, 1-methyl-3-dodecylimidazolium$^+$X$^-$, 1-methyl-3-tetradecylimidazolium$^+$X$^-$, 1-methyl-3-hexadecylimidazolium$^+$X$^-$, 1-methyl-3-octadecylimidazolium$^+$X$^-$, 1-(2-hydroxyethyl)-3-methylimidazolium$^+$X$^-$, and 1-allyl-3-methylimidazolium$^+$X$^-$.

In Formula (1), one or both of the hydrogen atoms at the 4- and 5-positions may also be substituted with a group, such as a hydrocarbon group, such as any of the hydrocarbon groups described above, an alkoxide group (—OR), hydroxy group (OH), amino group (—NH$_2$, —NHR, or —NR$_2$), carboxamide group (—C(O)NR$_2$ wherein one or both R groups can be replaced with H), and/or halogen atom (e.g., F, Cl, Br, or I atom), wherein the R groups may be the same or different and may or may not be interconnected to form a ring. For example, one or both of the 4- and 5-positions of the imidazole ring may be substituted with a methyl, ethyl, n-propyl, isopropyl, n-butyl, isobutyl, sec-butyl, or t-butyl group. R$^3$ at the 2-position may also be selected from any of the foregoing groups provided for the 4- and 5-positions. Moreover, any one or more of R$^1$, R$^2$ and R$^3$ may or may not also include an imidazole or imidazolium ring, which therefore may result in a bi-imidazolium, tri-imidazolium, or tetra-imidazolium cationic portion.

In some embodiments of Formula (1), R$^1$ and R$^3$, or R$^2$ and R$^3$ are interconnected, thereby forming an imidazolyl-containing bicyclic ring system. The interconnection can be saturated or unsaturated, and may or may not include substituting groups, as described above for the hydrocarbon groups R provided above. Some examples of ionic liquids containing such imidazolyl-containing bicyclic ring systems include those according to the following formulas:

(1a)

(1b)

In Formulas (1a) and (1b), R$^9$ and R$^{10}$ independently represent a hydrocarbon group, with or without heteroatom substitution, such as any of the hydrocarbon groups (R) described above for R$^1$, R$^2$ and R$^3$ of Formula (1). In particular embodiments, R$^9$ and R$^{10}$ are independently selected from methyl, ethyl, n-propyl, isopropyl, n-butyl, isobutyl, sec-butyl, t-butyl, n-pentyl, isopentyl, neopentyl, n-hexyl, isohexyl, vinyl, and allyl groups. Any of the hydrogen atoms at available carbon atoms in Formulas (1a) and (1b) may be substituted with a group, such as a hydrocarbon group, such as any of the hydrocarbon groups (R) described above, an alkoxide group (—OR), hydroxy group (OH), amino group (—NH$_2$, —NHR, or —NR$_2$), carboxamide group (—C(O)NR$_2$ wherein one or both R groups can be replaced with H), and/or halogen atom (e.g., F, Cl, Br, or I atom), wherein the R groups may be the same or different and may or may not be interconnected to form a ring.

In another embodiment, the ammonium ionic liquid is an N-hydrocarbylpyridinium-based ionic liquid having a structure of the general formula:

(2)

In Formula (2), R$^4$ represents a hydrocarbon group, with or without heteroatom substitution, such as any of the hydrocarbon groups (R) described above for R$^1$, R$^2$ and R$^3$ of Formula (1), and the counteranion X$^-$ can be any counteranion, such as those further described infra. Some general examples of N-alkylpyridinium-based ionic liquids include N-methylpyridinium$^+$X$^-$, N-ethylpyridinium$^+$X$^-$, N-n-propylpyridinium$^+$X$^-$, N-isopropylpyridinium$^+$X$^-$, N-n-butylpyridinium$^+$X$^-$, N-isobutylpyridinium$^+$X$^-$, N-sec-butylpyridinium$^+$X$^-$, N-t-butylpyridinium$^+$X$^-$, N-n-pentylpyridinium$^+$X$^-$, N-isopentylpyridinium$^+$X$^-$, N-neopentylpyridinium⁺X⁻, N-n-hexylpyridinium⁺X⁻, N-n-heptylpyridinium⁺X⁻, N-n-octylpyridinium⁺X⁻, N-n-nonylpyridinium⁺X⁻, N-n-decylpyridinium⁺X⁻, N-n-undecylpyridinium⁺X⁻, N-n-dodecylpyridinium⁺X⁻, N-n-tridecylpyridinium⁺X⁻, N-n-tetradecylpyridinium⁺X⁻, N-n-pentadecylpyridinium⁺X⁻, N-n-hexadecylpyridinium⁺X⁻, N-n-heptadecylpyridinium⁺X⁻, N-n-octadecylpyridinium⁺X⁻, N-vinylpyridinium⁺X⁻, N-allylpyridinium⁺X⁻, N-phenylpyridinium⁺X⁻, N-(2-hydroxyethyl)pyridinium⁺X⁻, N-benzylpyridinium⁺X⁻, and N-phenethylpyridinium⁺X⁻.

In Formula (2), any one or more of the hydrogen atoms on the ring carbon atoms can be substituted with one or more other groups, such as a hydrocarbon group (R), alkoxide group (—OR), hydroxy group (OH), amino group (—NH₂, —NHR, or —NR₂), carboxamide group (—C(O)NR₂ wherein one or both R groups can be replaced with H), and/or halogen atom (e.g., F, Cl, Br, or I atom), wherein the R groups may be the same or different and may or may not be interconnected to form a ring. Some examples of such ionic liquids include N-methyl-4-methylpyridinium X⁻, N-ethyl-4-methylpyridinium X⁻, N-methyl-4-ethylpyridinium X⁻, N-methyl-4-isopropylpyridinium X⁻, N-isopropyl-4-methylpyridinium X⁻, and N-octyl-4-methylpyridinium X. Moreover, any one or two of the ring carbon atoms ortho, meta, or para to the shown ring nitrogen atom in the pyridinium ring may be replaced with a respective number of ring nitrogen atoms, which may be neutral or positively charged ring nitrogen atoms.

In another embodiment, the ammonium ionic liquid is a quaternary ammonium ionic liquid having a structure of the general formula:

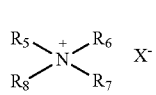

(3)

In Formula (3), R⁵, R⁶, R⁷, and R⁸ independently represent a hydrocarbon group, with or without heteroatom substitution, such as any of the hydrocarbon groups (R) described above for R¹, R² and R³ of Formula (1), or a hydrogen atom, wherein at least one of R⁵, R⁶, R⁷, and R⁸ represents a hydrocarbon group (with or without heteroatom substitution), and the counteranion X⁻ can be any counteranion, such as those described infra. In one embodiment, one of R⁵, R⁶, R⁷, and R⁸ is a hydrocarbon group while the rest are hydrogen atoms. In another embodiment, two of R⁵, R⁶, R⁷, and R⁸ are hydrocarbon groups while two are hydrogen atoms. In another embodiment, three of R⁵, R⁶, R⁷, and R⁸ are hydrocarbon groups while one is a hydrogen atom. In another embodiment, all of R⁵, R⁶, R⁷, and R⁸ are hydrocarbon groups (or more specifically, alkyl groups), thereby resulting in a tetrahydrocarbylammonium group (or more specifically, a tetraalkylammonium group). Some general examples of quaternary ammonium ionic liquids include methylammonium⁺X⁻, dimethylammonium⁺X⁻, trimethylammonium⁺X⁻, tetramethylammonium⁺X⁻, ethylammonium⁺X⁻, ethyltrimethylammonium⁺X⁻, diethylammonium⁺X⁻, triethylammonium⁺X⁻, tetraethylammonium⁺X⁻, n-propylammonium⁺X⁻, n-propyltrimethylammonium⁺X⁻, isopropylammonium⁺X⁻, n-butylammonium⁺X⁻, n-butyltrimethylammonium⁺X⁻, n-butylmethylammonium⁺X⁻, di-(n-butyl)dimethylammonium⁺X⁻, tri-(n-butyl)methylammonium⁺X⁻, n-pentylammonium⁺X⁻, n-pentyltrimethylammonium⁺X⁻, tri-(n-pentyl)methylammonium⁺X⁻, n-hexylammonium⁺X⁻, n-hexyltrimethylammonium⁺X⁻, tri-(n-hexyl)methylammonium⁺X⁻, n-heptylammonium⁺X⁻, n-heptyltrimethylammonium⁺X⁻, tri-(n-heptyl)methylammonium⁺X⁻, n-octylammonium⁺X⁻, n-octyltrimethylammonium⁺X⁻, tri-(n-octyl)methylammonium⁺X⁻, benzyltrimethylammonium⁺X⁻, choline⁺X⁻, 2-hydroxyethylammonium⁺X⁻, allylammonium⁺X⁻, allyltrimethylammonium⁺X⁻, [(2-methacryloxy)ethyl]-trimethylammonium⁺X⁻, and (4-vinylbenzyl)trimethylammonium⁺X⁻.

In another embodiment, the ammonium ionic liquid is a cyclic guanidinium-based ionic liquid. The cyclic guanidinium-based ionic liquid can have any of the structures known in the art, including those described in U.S. Pat. No. 8,129,543 and M. G. Bogdanov, et al., Z. Naturforsch, 65b, pp. 37-48, 2010, the contents of which are herein incorporated by reference in their entirety.

The cyclic guanidinium-based ionic liquid can be described by the following general formula:

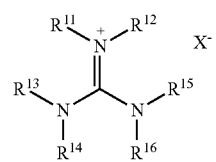

(4)

In Formula (4) above, R¹¹, R¹², R¹³, R¹⁴, R¹⁵, and/or R¹⁶ groups independently represent a hydrocarbon group, with or without heteroatom substitution, such as any of the hydrocarbon groups (R) described above for R¹, R² and R³ of Formula (1), or a hydrogen atom, provided that at least two of R¹¹, R¹², R¹³, R¹⁴, R¹⁵, and R¹⁶ are interconnected to form a ring or a bicyclic, tricylic, or higher cyclic ring system. In some embodiments, R¹¹, R¹², R¹³, R¹⁴, R¹⁵ and/or R¹⁶ groups are independently selected from methyl, ethyl, n-propyl, isopropyl, n-butyl, isobutyl, sec-butyl, t-butyl, n-pentyl, isopentyl, neopentyl, n-hexyl, isohexyl, vinyl, and allyl groups, provided that at least two of R¹¹, R¹², R¹³, R¹⁴, R¹⁵, and R¹⁶ are interconnected to form a ring or a bicyclic, tricyclic, or higher cyclic ring system. In a first set of embodiments, R¹¹ and R¹² are interconnected. In a second set of embodiments, R¹³ and R¹⁴, or R¹⁵ and R¹⁶, are interconnected. In a third set of embodiments, R¹¹ and R¹³, or R¹² and R¹⁵, are interconnected. In a fourth set of embodiments, R¹⁴ and R¹⁶ are interconnected. In other embodiments, any two or three of the foregoing types of interconnections are combined. The foregoing embodiments also include the possibility that all of R¹¹, R¹², R¹³, R¹⁴, R¹⁵, and R¹⁶ groups are engaged in an interconnection. The counteranion X⁻ can be any counteranion, such as those described infra.

In particular embodiments, the cyclic guanidinium-based ionic liquid has a structure of any of the following general formulas:

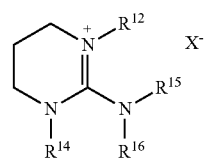

(4a)

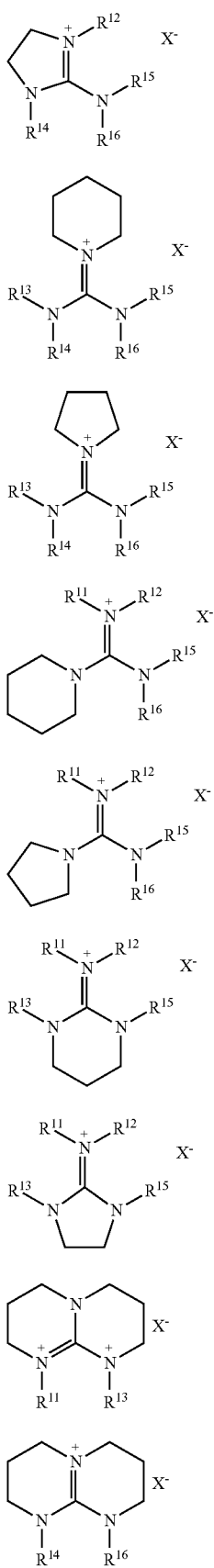
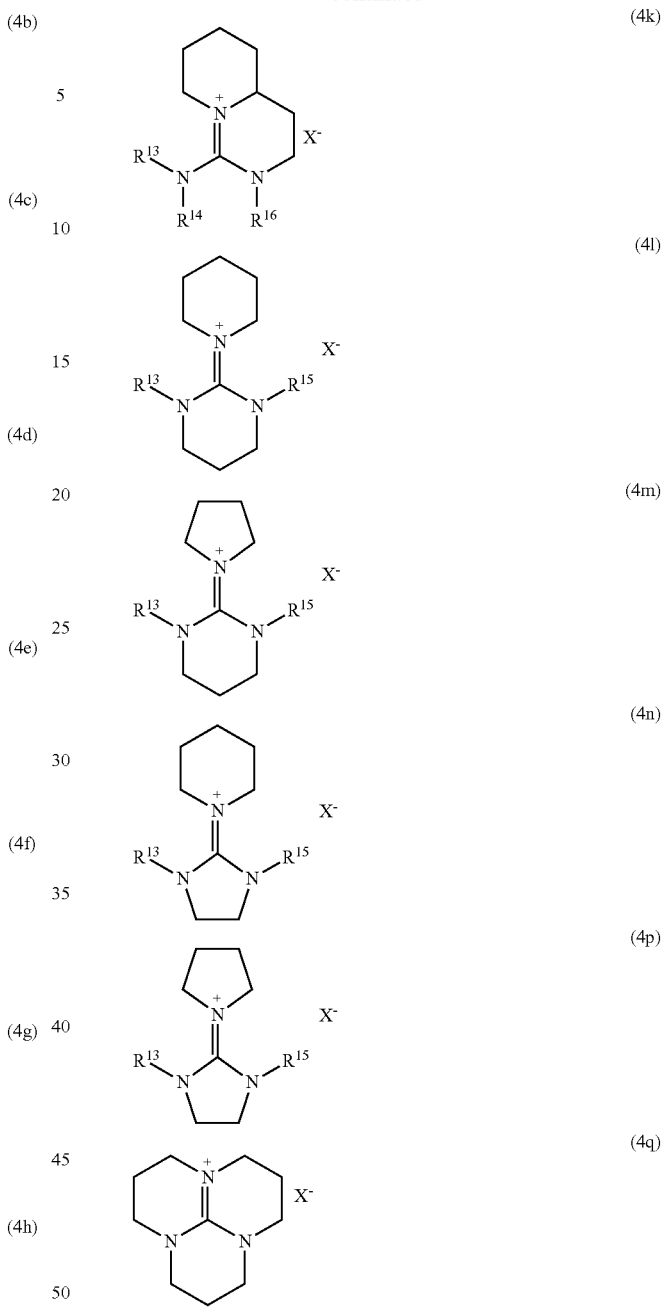

In some embodiments, any of the cyclic guanidinium structures shown in Formulas (4a)-(4q) may have a ring carbon atom replaced with a heteroatom selected from oxygen (O), sulfur (S), and/or nitrogen (—NR—). Moreover, any of the hydrogen atoms residing on ring carbon atoms may be substituted with one or more other groups, such as a hydrocarbon group (R), alkoxide group (—OR), hydroxy group (OH), amino group (—NH$_2$, —NHR, or —NR$_2$), carboxamide group (—C(O)NR$_2$ wherein one or both R groups can be replaced with H), and/or halogen atom (e.g., F, Cl, Br, or I atom), wherein the R groups may be the same or different and may or may not be interconnected to form a ring.

In another embodiment, the ammonium ionic liquid is a piperidinium-based ionic liquid having a structure of the following general formula:

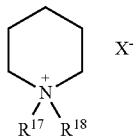
(5)

In Formula (5), $R^{17}$ and $R^{18}$ independently represent a hydrocarbon group, with or without heteroatom substitution, such as any of the hydrocarbon groups (R) described above for $R^1$, $R^2$ and $R^3$ of Formula (1), and the counteranion $X^-$ can be any of the counteranions described infra. Some examples of piperidinium-based ionic liquids include 1,1-dimethylpiperidinium$^+X^-$, 1-methyl-1-ethylpiperidinium$^+X^-$, 1-methyl-1-propylpiperidinium$^+X^-$, 1-methyl-1-butylpiperidinium$^+X^-$, 1-methyl-1-isobutylpiperidinium$^+X^-$, 1-methyl-1-pentylpiperidinium$^+X^-$, 1-methyl-1-hexylpiperidinium$^+X^-$, 1-methyl-1-heptylpiperidinium$^+X^-$, 1-methyl-1-octylpiperidinium$^+X^-$, 1-methyl-1-decylpiperidinium$^+X^-$, 1-methyl-1-dodecylpiperidinium$^+X^-$, 1-methyl-1-tetradecylpiperidinium$^+X^-$, 1-methyl-1-hexadecylpiperidinium$^+X^-$, 1-methyl-1-octadecylpiperidinium$^+X^-$, 1,1-diethylpiperidinium$^+X^-$, 1,1-dipropylpiperidinium$^+X^-$, 1,1-dibutylpiperidinium$^+X^-$, and 1,1-diisobutylpiperidinium$^+X^-$. In some embodiments, the piperidinium ring shown in Formula (5) may have a ring carbon atom replaced with a heteroatom selected from oxygen (O), sulfur (S), and/or nitrogen (—NR—). Moreover, any of the hydrogen atoms residing on ring carbon atoms may be substituted with one or more other groups, such as a hydrocarbon group (R), alkoxide group (—OR), hydroxy group (OH), amino group (—NH$_2$, —NHR, or —NR$_2$), carboxamide group (—C(O)NR$_2$ wherein one or both R groups can be replaced with H), and/or halogen atom (e.g., F, Cl, Br, or I atom), wherein the R groups may be the same or different and may or may not be interconnected to form a ring.

In another embodiment, the ammonium ionic liquid is a pyrrolidinium-based ionic liquid having a structure of the following general formula:

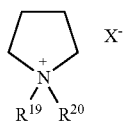
(6)

In Formula (6), $R^{19}$ and $R^{20}$ independently represent a hydrocarbon group, with or without heteroatom substitution, such as any of the hydrocarbon groups (R) described above for $R^1$, $R^2$ and $R^3$ of Formula (1), and the counteranion $X^-$ can be any of the counteranions described infra. Some examples of pyrrolidinium-based ionic liquids include 1,1-dimethylpyrrolidinium$^+X^-$, 1-methyl-1-ethylpyrrolidinium$^+X^-$, 1-methyl-1-propylpyrrolidinium$^+X^-$, 1-methyl-1-butylpyrrolidinium$^+X^-$, 1-methyl-1-isobutylpyrrolidinium$^+X^-$, 1-methyl-1-pentylpyrrolidinium$^+X^-$, 1-methyl-1-hexylpyrrolidinium$^+X^-$, 1-methyl-1-heptylpyrrolidinium$^+X^-$, 1-methyl-1-octylpyrrolidinium$^+X^-$, 1-methyl-1-decylpyrrolidinium$^+X^-$, 1-methyl-1-dodecylpyrrolidinium$^+X^-$, 1-methyl-1-tetradecylpyrrolidinium$^+X^-$, 1-methyl-1-hexadecylpyrrolidinium$^+X^-$, 1-methyl-1-octadecylpyrrolidinium$^+X^-$, 1,1-diethylpyrrolidinium$^+X^-$, 1,1-dipropylpyrrolidinium$^+X^-$, 1,1-dibutylpyrrolidinium$^+X^-$, and 1,1-diisobutylpyrrolidinium$^+X^-$. In some embodiments, the pyrrolidinium ring shown in Formula (6) may have a ring carbon atom replaced with a heteroatom selected from oxygen (O), sulfur (S), and/or nitrogen (—NR—). Moreover, any of the hydrogen atoms residing on ring carbon atoms may be substituted with one or more other groups, such as a hydrocarbon group (R), alkoxide group (—OR), hydroxy group (OH), amino group (—NH$_2$, —NHR, or —NR$_2$), carboxamide group (—C(O)NR$_2$ wherein one or both R groups can be replaced with H), and/or halogen atom (e.g., F, Cl, Br, or I atom), wherein the R groups may be the same or different and may or may not be interconnected to form a ring.

In other aspects, the ionic liquid is a phosphonium-based ionic liquid. The phosphonium-based ionic liquid can have a structure of the following general formula:

(7)

In Formula (7), $R^{21}$, $R^{22}$, $R^{23}$, and $R^{24}$ independently represent a hydrocarbon group, with or without heteroatom substitution, such as any of the hydrocarbon groups (R) described above for $R^1$, $R^2$ and $R^3$ of Formula (1), and the counteranion $X^-$ can be any of the counteranions described infra. Some general examples of phosphonium-based ionic liquids include tetramethylphosphonium$^+X^-$, tetraethylphosphonium$^+X^-$, tetrapropylphosphonium$^+X^-$, tetrabutylphosphonium$^+X^-$, tetrapentylphosphonium$^+X^-$, tetrahexylphosphonium$^+X^-$, tetraheptylphosphonium$^+X^-$, tetraoctylphosphonium$^+X^-$, tetranonylphosphonium$^+X^-$, tetradecylphosphonium$^+X^-$, tetraphenylphosphonium$^+X^-$, tetrabenzylphosphonium$^+X^-$, ethyltrimethylphosphonium$^+X^-$, n-propyltrimethylphosphonium$^+X^-$, butyltrimethylphosphonium$^+X^-$, dibutyldimethylphosphonium$^+X^-$, tributylmethylphosphonium$^+X^-$, butyltriethylphosphonium$^+X^-$, dibutyldiethylphosphonium$^+X^-$, tributylethylphosphonium$^+X^-$, triisobutylmethylphosphonium$^+X^-$, tributylhexylphosphonium$^+X^-$, tributylheptylphosphonium$^+X^-$, tributyloctylphosphonium$^+X^-$, tributyldecylphosphonium$^+X^-$, tributyldodecylphosphonium$^+X^-$, tributyltetradecylphosphonium$^+X^-$, tributylhexadecylphosphonium$^+X^-$, hexyltrimethylphosphonium$^+X^-$, dihexyldimethylphosphonium$^+X^-$, trihexylmethylphosphonium$^+X^-$, hexyltriethylphosphonium$^+X^-$, trihexyloctylphosphonium$^+X^-$, trihexyldecylphosphonium$^+X^-$, trihexyldodecylphosphonium$^+X^-$, trihexyltetradecylphosphonium$^+X^-$, trihexylhexadecylphosphonium$^+X^-$, octyltrimethylphosphonium$^+X^-$, dioctyldimethylphosphonium$^+X^-$, trioctylmethylphosphonium$^+X^-$, octyltriethylphosphonium$^+X^-$, trioctyldecylphosphonium$^+X^-$, trioctyldodecylphosphonium$^+X^-$, trioctyltetradecylphosphonium$^+X^-$, trioctylhexadecylphosphonium$^+X^-$, tridecylmethylphosphonium$^+X^-$, phenyltrimethylphosphonium$^+X^-$, phenyltriethylphosphonium$^+X^-$, phenyltripropylphosphonium$^+X^-$, phenyltributylphosphonium$^+X^-$, diphenyldimethylphosphonium$^+X^-$, triphenylmethylphosphonium$^+X^-$, and benzyltrimethylphosphonium$^+X^-$.

In some embodiments of Formula (7), two or three of $R^{21}$, $R^{22}$, $R^{23}$, and $R^{24}$ are interconnected to form a phosphonium-containing ring or bicyclic ring system. Some general examples of phosphonium ionic liquids containing a phosphorus-containing ring or bicyclic ring system are provided by the following formulas:

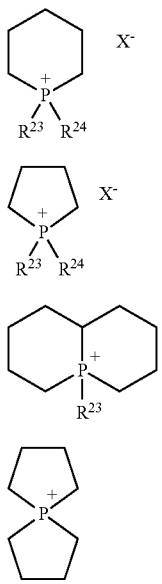

(7a)

(7b)

(7c)

(7d)

In some embodiments, the cyclic phosphonium ring shown in any of Formulas (7a)-(7d) may have a ring carbon atom replaced with a heteroatom selected from oxygen (O), sulfur (S), and/or nitrogen (—NR—). Moreover, any of the hydrogen atoms residing on ring carbon atoms may be substituted with one or more other groups, such as a hydrocarbon group (R), alkoxide group (—OR), hydroxy group (OH), amino group (—NH$_2$, —NHR, or —NR$_2$), carboxamide group (—C(O)NR$_2$ wherein one or both R groups can be replaced with H), and/or halogen atom (e.g., F, Cl, Br, or I atom), wherein the R groups may be the same or different and may or may not be interconnected to form a ring. Any of the phosphonium cationic portions shown in any of Formulas (7) and (7a)-(7d) may also include one or more substituents containing another neutral or charged phosphorus atom, such that the phosphonium ionic liquid may be a diphosphonium or triphosphonium ionic liquid, as derived from, for example, 1,2-bis(diphenylphosphino)ethane (dppe) by appropriate alkylation.

In other aspects, the ionic liquid is a sulfonium-based ionic liquid. The sulfonium-based ionic liquid can have a structure of the following general formula:

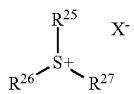

(8)

In Formula (8), $R^{25}$, $R^{26}$, and $R^{27}$ independently represent a hydrocarbon group, with or without heteroatom substitution, such as any of the hydrocarbon groups (R) described above for $R^1$, $R^2$ and $R^3$ of Formula (1), and the counteranion $X^-$ can be any of the counteranions described infra. Some general examples of sulfonium-based ionic liquids include trimethylsulfonium$^+$X$^-$, dimethylethylsulfonium$^+$X$^-$, diethylmethylsulfonium$^+$X$^-$, triethylsulfonium$^+$X$^-$, dimethylpropylsulfonium$^+$X$^-$, dipropylmethylsulfonium$^+$X$^-$, tripropylsulfonium$^+$X$^-$, dimethylbutylsulfonium$^+$X$^-$, dibutylmethylsulfonium$^+$X$^-$, tributylsulfonium$^+$X$^-$, dimethylhexylsulfonium$^+$X$^-$, dihexylmethylsulfonium$^+$X$^-$, trihexylsulfonium$^+$X$^-$, dimethyloctylsulfonium$^+$X$^-$, dioctylmethylsulfonium$^+$X$^-$, and trioctylsulfonium$^+$X$^-$.

In some embodiments of Formula (8), two or three of $R^{25}$, $R^{26}$, and $R^{27}$ are interconnected to form a sulfonium-containing ring or bicyclic ring system, as described above for the phosphonium cyclic systems. Some examples of sulfonium ionic liquids containing a sulfonium-containing ring or bicyclic ring system are provided by the following formulas:

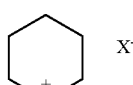

(8a)

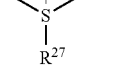

(8b)

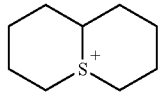

(8c)

In some embodiments, the cyclic sulfonium ring shown in any of Formulas (8a)-(8c) may have a ring carbon atom replaced with a heteroatom selected from oxygen (O), sulfur (S), and/or nitrogen (—NR—). Moreover, any of the hydrogen atoms residing on ring carbon atoms may be substituted with one or more other groups, such as a hydrocarbon group (R), alkoxide group (—OR), hydroxy group (OH), amino group (—NH$_2$, —NHR, or —NR$_2$), carboxamide group (—C(O)NR$_2$ wherein one or both R groups can be replaced with H), and/or halogen atom (e.g., F, Cl, Br, or I atom), wherein the R groups may be the same or different and may or may not be interconnected to form a ring. Any of the sulfonium cationic portions shown in any of Formulas (8) and (8a)-(8c) may also include one or more substituents containing another neutral or charged sulfur atom, such that the sulfonium ionic liquid may be a disulfonium or trisulfonium ionic liquid, as derived from, for example, a benzodithiophene or 3,3'-dibromo-2,2'-dithiophene by appropriate alkylation.

In some embodiments, any of the above general classes or specific types of ionic liquids, or general classes or specific types of cationic portions of the above ionic liquids, are excluded. Moreover, in some embodiments, a mixture of two or more of the foregoing ionic liquids is used.

The counteranion (X$^-$) of the ionic liquid is any counteranion which, when associated with the cationic component, permits the resulting ionic compound to behave as an ionic liquid. As known in the art, the composition and structure of the counteranion strongly affects the properties (e.g., melting point, volatility, stability, viscosity, hydrophobicity, and so on) of the ionic liquid. In some embodiments, the counteranion is structurally symmetrical, while in other embodiments, the counteranion is structurally asymmetrical.

In one embodiment, the counteranion of the ionic liquid is non-carbon-containing (i.e., inorganic). The inorganic counteranion may, in one embodiment, lack fluorine atoms. Some examples of such counteranions include chloride, bromide, iodide, hexachlorophosphate (PCl$_6^-$), perchlorate, chlorate, chlorite, cyanate, isocyanate, thiocyanate, isothiocyanate, perbromate, bromate, bromite, periodiate, iodate, dicyanamide (i.e., N(CN)$_2^-$), tricyanamide (i.e., N(CN)$_3^-$), aluminum chlorides (e.g., Al$_2$Cl$_7^-$ and AlCl$_4^-$), aluminum bromides (e.g., AlBr$_4^-$), nitrate, nitrite, sulfate, sulfite, hydrogensulfate, hydrogensulfite, phosphate, hydrogenphosphate (HPO$_4^{2-}$), dihydrogenphosphate (H$_2$PO$_4^-$), phosphite, arsenate, antimonate, selenate, tellurate, tungstate, molybdate, chromate, silicate, the borates (e.g., borate, diborate, triborate, tetraborate), anionic borane and carborane clusters (e.g., B$_{10}$H$_{10}^{2-}$ and B$_{12}$H$_{12}^{2-}$), perrhenate, permanganate, ruthenate, perruthenate, and the polyoxometallates. The inorganic counteranion may, in another embodiment, include fluorine atoms. Some examples of such counteranions include fluoride, bifluoride (HF$_2^-$), hexafluorophosphate (PF$_6^-$), fluorophosphate (PO$_3$F$^{2-}$), tetrafluoroborate (BF$_4^-$), aluminum fluorides (e.g., AlF$_4^-$), hexafluoroarsenate (AsF$_6^-$), and hexafluoroantimonate (SbF$_6^-$).

In another embodiment, the counteranion of the ionic liquid is carbon-containing (i.e., organic). The organic counteranion may, in one embodiment, lack fluorine atoms. Some examples of such counteranions include carbonate, bicarbonate, the carboxylates (e.g., formate, acetate, propionate, butyrate, valerate, lactate, pyruvate, oxalate, malonate, glutarate, adipate, decanoate, salicylate, ibuprofenate, and the like), the sulfonates (e.g., CH$_3$SO$_3^-$, CH$_3$CH$_2$SO$_3^-$, CH$_3$(CH$_2$)$_2$SO$_3^-$, benzenesulfonate, toluenesulfonate, dodecylbenzenesulfonate, docusate, and the like), the alkoxides (e.g., methoxide, ethoxide, isopropoxide, phenoxide, and glycolate), the amides (e.g., dimethylamide and diisopropylamide), diketonates (e.g., acetylacetonate), the organoborates (e.g., BR$_1$R$_2$R$_3$R$_4^-$, wherein R$_1$, R$_2$, R$_3$, R$_4$ are typically hydrocarbon groups containing 1 to 6 carbon atoms), the alkylsulfates (e.g., diethylsulfate), alkylphosphates (e.g., ethylphosphate or diethylphosphate), and the phosphinates (e.g., bis-(2,4,4-trimethylpentyl)phosphinate). The organic counteranion may, in another embodiment, include fluorine atoms. Some examples of such counteranions include the fluorosulfonates (e.g., CF$_3$SO$_3^-$, CF$_3$CF$_2$SO$_3^-$, CF$_3$(CF$_2$)$_2$SO$_3^-$, CHF$_2$CF$_2$SO$_3^-$, and the like), the fluoroalkoxides (e.g., CF$_3$O$^-$, CF$_3$CH$_2$O$^-$, CF$_3$CF$_2$O$^-$, and pentafluorophenolate), the fluorocarboxylates (e.g., trifluoroacetate and pentafluoropropionate), and the fluorosulfonylimides (e.g., (CF$_3$SO$_2$)$_2$N$^-$).

In particular embodiments, the counteranion (X$^-$) of the ionic liquid has a structure according to the following general formula:

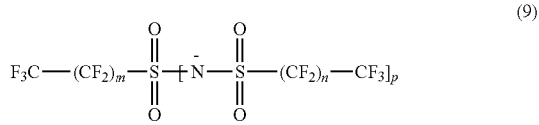

(9)

In Formula (9) above, subscripts m and n are independently 0 or an integer of 1 or above. Subscript p is 0 or 1, provided that when p is 0, the group —N—SO$_2$—(CF$_2$)$_n$CF$_3$ subtended by p is replaced with an oxide atom connected to the sulfur atom (S).

In one embodiment of Formula (9), subscript p is 1, so that Formula (9) reduces to the chemical formula:

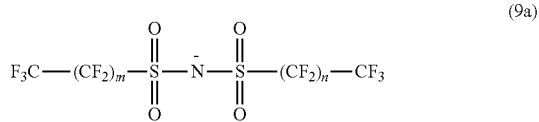

(9a)

In one embodiment of Formula (9a), m and n are the same number, thereby resulting in a symmetrical counteranion. In another embodiment of formula (9a), m and n are not the same number, thereby resulting in an asymmetrical counteranion.

In a first set of embodiments of Formula (9a), m and n are independently at least 0 and up to 1, 2, 3, 4, 5, 6, 7, 8, 9, 10, or 11. When m and n are both 0, the resulting anion has the formula F$_3$CSO$_2$NSO$_2$CF$_3$, i.e., bis-(trifluoromethylsulfonyl)imide, or Tf$_2$N$^-$. In another embodiment, m and n are not both 0. For example, in a particular embodiment, m is 0 while n is a value of 1 or above (e.g., 1, 2, 3, 4, 5, 6, 7, 8, 9, 10, or 11). Some examples of such anions include F$_3$CSO$_2$NSO$_2$CF$_2$CF$_3$, F$_3$CSO$_2$NSO$_2$(CF$_2$)$_2$CF$_3$, F$_3$CSO$_2$NSO$_2$(CF$_2$)$_3$CF$_3$, F$_3$CSO$_2$NSO$_2$(CF$_2$)$_4$CF$_3$, F$_3$CSO$_2$NSO$_2$(CF$_2$)$_5$CF$_3$, and so on, wherein it is understood that, in the foregoing examples, the negative sign indicative of a negative charge (i.e., "–") in the anion has been omitted for the sake of clarity.

In a second set of embodiments of Formula (9a), m and n are independently at least 1 and up to 2, 3, 4, 5, 6, 7, 8, 9, 10, or 11. For example, in a particular embodiment, m is 1 while n is a value of 1 or above (e.g., 1, 2, 3, 4, 5, 6, 7, 8, 9, 10, or 11). Some examples of such anions include N[SO$_2$CF$_2$CF$_3$]$_2$ (i.e., "BETI$^-$"), F$_3$CF$_2$CSO$_2$NSO$_2$(CF$_2$)$_2$CF$_3$, F$_3$CF$_2$CSO$_2$NSO$_2$(CF$_2$)$_3$CF$_3$, F$_3$CF$_2$CSO$_2$NSO$_2$(CF$_2$)$_4$CF$_3$, F$_3$CF$_2$CSO$_2$NSO$_2$(CF$_2$)$_5$CF$_3$, and so on.

In a third set of embodiments of Formula (9a), m and n are independently at least 2 and up to 3, 4, 5, 6, 7, 8, 9, 10, or 11. For example, in a particular embodiment, m is 2 while n is a value of 2 or above (e.g., 2, 3, 4, 5, 6, 7, 8, 9, 10, or 11). Some examples of such anions include N[SO$_2$(CF$_2$)$_2$CF$_3$]$_2$, F$_3$C(F$_2$C)$_2$SO$_2$NSO$_2$(CF$_2$)$_3$CF$_3$, F$_3$C(F$_2$C)$_2$SO$_2$NSO$_2$(CF$_2$)$_4$CF$_3$, F$_3$C(F$_2$C)$_2$SO$_2$NSO$_2$(CF$_2$)$_5$CF$_3$, and so on.

In a fourth set of embodiments of Formula (9a), m and n are independently at least 3 and up to 4, 5, 6, 7, 8, 9, 10, or 11. For example, in a particular embodiment, m is 3 while n is a value of 3 or above (e.g., 3, 4, 5, 6, 7, 8, 9, 10, or 11). Some examples of such anions include N[SO$_2$(CF$_2$)$_3$CF$_3$]$_2$, F$_3$C(F$_2$C)$_3$SO$_2$NSO$_2$(CF$_2$)$_4$CF$_3$, F$_3$C(F$_2$C)$_3$SO$_2$NSO$_2$(CF$_2$)$_5$CF$_3$, F$_3$C(F$_2$C)$_3$SO$_2$NSO$_2$(CF$_2$)$_6$CF$_3$, F$_3$C(F$_2$C)$_3$SO$_2$NSO$_2$(CF$_2$)$_7$CF$_3$, and so on.

In a fifth set of embodiments of Formula (9a), m and n are independently at least 4 and up to 5, 6, 7, 8, 9, 10, or 11. For example, in a particular embodiment, m is 4 while n is a value of 4 or above (e.g., 4, 5, 6, 7, 8, 9, 10, or 11). Some examples of such anions include N[SO$_2$(CF$_2$)$_4$CF$_3$]$_2$, F$_3$C(F$_2$C)$_4$SO$_2$NSO$_2$(CF$_2$)$_5$CF$_3$, F$_3$C(F$_2$C)$_4$SO$_2$NSO$_2$(CF$_2$)$_6$CF$_3$, F$_3$C(F$_2$C)$_4$SO$_2$NSO$_2$(CF$_2$)$_7$CF$_3$, F$_3$C(F$_2$C)$_4$SO$_2$NSO$_2$(CF$_2$)$_8$CF$_3$, and so on.

In a sixth set of embodiments of Formula (9a), m and n are independently at least 5 and up to 6, 7, 8, 9, 10, or 11. For example, in a particular embodiment, m is 5 while n is a value of 5 or above (e.g., 5, 6, 7, 8, 9, 10, or 11). Some examples of such anions include N[SO$_2$(CF$_2$)$_5$CF$_3$]$_2$, F$_3$C(F$_2$C)$_5$SO$_2$NSO$_2$(CF$_2$)$_6$CF$_3$, F$_3$C(F$_2$C)$_5$SO$_2$NSO$_2$(CF$_2$)$_7$CF$_3$, F$_3$C(F$_2$C)$_5$SO$_2$NSO$_2$(CF$_2$)$_8$CF$_3$, F$_3$C(F$_2$C)$_5$SO$_2$NSO$_2$(CF$_2$)$_9$CF$_3$, and so on.

In a seventh set of embodiments of Formula (9a), m and n are independently at least 6 and up to 7, 8, 9, 10, or 11. For example, in a particular embodiment, m is 6 while n is a value of 6 or above (e.g., 6, 7, 8, 9, 10, or 11). Some examples of such anions include N[SO$_2$(CF$_2$)$_6$CF$_3$]$_2$, F$_3$C(F$_2$C)$_6$SO$_2$NSO$_2$(CF$_2$)$_7$CF$_3$, F$_3$C(F$_2$C)$_6$SO$_2$NSO$_2$(CF$_2$)$_8$CF$_3$, F$_3$C(F$_2$C)$_6$SO$_2$NSO$_2$(CF$_2$)$_9$CF$_3$, F$_3$C(F$_2$C)$_6$SO$_2$NSO$_2$(CF$_2$)$_{10}$CF$_3$, and so on.

In other embodiments of Formula (9a), m abides by one or a number of alternative conditions set forth in one of the foregoing seven embodiments while n abides by one or a number of alternative conditions set forth in another of the foregoing seven embodiments.

In another embodiment of Formula (9), subscript p is 0, so that Formula (9) reduces to the chemical formula:

(9b)

In different exemplary embodiments of Formula (9b), m can be 0 or above (e.g., up to 1, 2, 3, 4, 5, 6, 7, 8, 9, 10, or 11), 1 or above (e.g., up to 2, 3, 4, 5, 6, 7, 8, 9, 10, or 11), 2 or above (e.g., up to 3, 4, 5, 6, 7, 8, 9, 10, or 11), 3 or above (e.g., up to 4, 5, 6, 7, 8, 9, 10, or 11), 4 or above (e.g., up to 5, 6, 7, 8, 9, 10, or 11), 5 or above (e.g., up to 6, 7, 8, 9, 10, or 11), 6 or above (e.g., up to 7, 8, 9, 10, or 11), 7 or above (e.g., up to 8, 9, 10, 11, or 12), 8 or above (e.g., up to 9, 10, 11, or 12), or 9 or above (e.g., up to 10, 11, 12, 13, 14, 15, or 16). Some examples of such anions include $F_3CSO_3^-$ (i.e., "triflate" or "TfO$^-$"), $F_3CF_2CSO_3^-$, $F_3C(F_2C)_2SO_3^-$, $F_3C(F_2C)_3SO_3^-$ (i.e., "nonaflate" or "NfO$^-$"), $F_3C(F_2C)_4SO_3^-$, $F_3C(F_2C)_5SO_3^-$, $F_3C(F_2C)_6SO_3^-$, $F_3C(F_2C)_7SO_3^-$, $F_3C(F_2C)_8SO_3^-$, $F_3C(F_2C)_9SO_3^-$, $F_3C(F_2C)_{10}SO_3^-$, $F_3C(F_2C)_{11}SO_3^-$, and so on.

The ionic liquid can be of any suitable purity level. Preferably, the ionic liquid has a purity at least or greater than 90%, 95%, 96%, 97%, 98%, 99%, 99.5%, or 99.9%. The ionic liquid is preferably substantially devoid of salt byproducts (e.g., $LiNO_3$) that are typically produced during synthesis of the ionic liquid. In preferred embodiments, it is desirable that the ionic liquid contains less than 1% by weight of salt byproducts, and more preferably, less than 0.5%, 0.1%, 0.01%, or even 0.001% by weight of salt byproducts.

In one embodiment, the ionic liquid or aqueous substrate is not admixed with a non-ionic liquid in the method. For example, the ionic liquid or aqueous substrate used in the method can be substantially devoid of any solvents (e.g., alcohols, ethers, amides, alkylchlorides, or the like), neutral or charged complexing agents, neutral or charged extractants, or electrolyte salts.

In another embodiment, the ionic liquid or aqueous substrate may be admixed with one or more non-ionic liquids in the method. The one or more non-ionic liquids may function as, for example, a solvent for the ionic liquid or other admixed compounds, as a process modifier, or as an extractant molecule to facilitate extraction or separation of the one or more radioisotopes.

In one embodiment, the ionic liquid or aqueous substrate is admixed with a polar protic liquid. Some examples of polar protic non-ionic liquids include water, the alcohols (e.g., methanol, ethanol, isopropanol, n-butanol, t-butanol, the pentanols, hexanols, octanols, or the like), diols (e.g., ethylene glycol, diethylene glycol, triethylene glycol), and protic amines (e.g., ethylenediamine, ethanolamine, diethanolamine, and triethanolamine).

In another embodiment, the ionic liquid or aqueous substrate is admixed with a polar non-protic liquid. Some examples of polar non-protic non-ionic liquids include the nitriles (e.g., acetonitrile, propionitrile), sulfoxides (e.g., dimethylsulfoxide), amides (e.g., dimethylformamide, N,N-dimethylacetamide), organochlorides (e.g., methylene chloride, chloroform, 1,1,-trichloroethane), ketones (e.g., acetone, 2-butanone), dialkylcarbonates (e.g., ethylene carbonate, dimethylcarbonate, diethylcarbonate), organoethers (e.g., diethyl ether, tetrahydrofuran, and dioxane), HMPA, NMP, and DMPU.

In yet another embodiment, the non-ionic liquid or aqueous substrate is admixed with a non-polar liquid. Some examples of non-polar liquids include the liquid hydrocarbons, such as a pentane, hexane, heptane, octane, pentene, hexene, heptene, octene, benzene, toluene, or xylene.

In one embodiment, the ionic liquid or aqueous substrate is admixed with one or more electrolyte salts or acids in the method. The acid can be a strong acid (e.g., the mineral acids, such as hydrofluoric, hydrochloric, hydrobromic, nitric, or sulfur acid) or a weak acid (e.g., phosphoric acid, boric acid, or an organoacid, such as a carboxylic acid, such as acetic or propionic acid). Some examples of electrolyte salts include the fluoride-containing electrolytes (e.g., KF, LiF, NaF, $NH_4F$, or a tetraalklyammonium fluoride, such as $Bu_4NF$), chloride-containing electrolytes (e.g., KCl, NaCl, $NH_4Cl$, or a tetraalklyammonium chloride, such as $Et_4NCl$), bromide-containing salts (e.g., HBr, KBr, NaBr, $NH_4Br$, or a tetraalklyammonium bromide, such as $Bu_4NBr$), nitrate salts (e.g., $LiNO_3$, $NaNO_3$, $KNO_3$, and $Mg(NO_3)_2$), nitrite salts, phosphate salts, phosphite salts, alkylphosphate salts, phosphinate salts, sulfate salts, alkylsulfate salts, carboxylate salts (e.g., sodium glycolate, sodium acetate, sodium propionate, potassium oxalate), carbonate salts, bicarbonate salts, perchlorate salts, chlorate salts, perbromate salts, and bromate salts.

The ionic liquid or aqueous substrate may be admixed with one or more surfactants in the method. The surfactants can be included to, for example, suitably adjust the mixing or subsequent separation of ionic liquid and aqueous substrate, or to enhance the efficiency of extraction or separation of radioisotopes.

In one embodiment, the one or more surfactants include an ionic surfactant, which can be either an anionic, cationic, or zwitterionic surfactant. Some examples of anionic surfactants include the fluorinated and non-fluorinated carboxylates (e.g., perfluorooctanoates, perfluorodecanoates, perfluorotetradecanoates, octanoates, decanoates, tetradecanoates, fatty acid salts), the fluorinated and non-fluorinated sulfonates (e.g., perfluorooctanesulfonates, perfluorodecanesulfonates, octanesulfonates, decanesulfonates, alkyl benzene sulfonate), the fluorinated and non-fluorinated sulfate salts (e.g., dodecyl sulfates, lauryl sulfates, sodium lauryl ether sulfate, perfluorododecyl sulfate, and other alkyl and perfluoroalkyl sulfate salts). The majority of cationic surfactants contain a positively charged nitrogen atom, such as found in the quaternary ammonium surfactants, e.g., the alkyltrimethylammonium salts wherein the alkyl group typically possesses at least four carbon atoms and up to 14, 16, 18, 20, 22, 24, or 26 carbon atoms. Some examples of cationic surfactants include the quaternary ammonium surfactants (e.g., cetyl trimethylammonium bromide, benzalkonium chloride, and benzethonium chloride), the pyridinium surfactants (e.g., cetylpyridinium chloride), and the polyethoxylated amine surfactants (e.g., polyethoxylated tallow amine). Some examples of zwitterionic surfactants include the betaines (e.g., dodecyl betaine, cocamidopropyl betaine) and the glycinates. Some examples of non-ionic surfactants include the alkyl polyethyleneoxides, alkylphenol polyethyleneoxides, copolymers of polyethyleneoxide and polypropyleneoxide (e.g., poloxamers and poloxamines), alkyl polyglucosides (e.g., octyl glucoside, decyl maltoside), fatty alcohols, (e.g., cetyl alcohol, oleyl alcohol), fatty amides (e.g., cocamide MEA, cocamide DEA), and polysorbates (e.g., polysorbate 20, polysorbate 40, polysorbate 60, polysorbate 80).

In some embodiments, the ionic liquid or aqueous substrate may be admixed with one or more extractant molecules in the method. The extractant molecule considered herein is generally a neutral (i.e., non-ionic) or negatively-charged molecule, typically non-polymeric and not an ionic liquid, typically having a molecular weight of up to or less than, for example, 5000, 2000, 1000, 500, 200, 100, or 50 g/mole. The extractant molecule generally possesses one or more functional groups that favorably interact with a metal (or particularly, the metal to be extracted), typically by binding to the metal to be extracted. The one or more functional groups may be selected from, for example, carbonyl, ether, amide, phosphine, mercaptan, carboxylate, carboxylic acid, phosphate, and phosphoric acid groups.

In a first set of embodiments, the extractant molecule has a structure according to the following general formula:

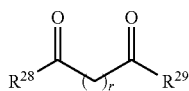

(10)

In Formula (10) above, $R^{28}$ and $R^{29}$ are independently any of the unsubstituted or substituted hydrocarbon groups (R) described above, and subscript r can be 0 (resulting in a vicinal diketone) or precisely, at least, above, or up to, for example, 1, 2, 3, 4, 5, 6, 7, 8, 9, 10, 11, or 12, thereby resulting in a linker having an equivalent number of linking atoms. In one embodiment, the linker subtended by r is composed of only carbon atoms, as found in acetylacetate (wherein $R^{28}$ and $R^{29}$ are both methyl groups and r is 1). In other embodiments, the linker subtended by r includes one or more linking heteroatoms, such as —O—, —NH—, —NR—, or —S—, either by replacing a linking carbon atom or by inserting between linking carbon atoms.

In particular embodiments of Formula (10), at least one of $R^{28}$ and $R^{29}$ is an amino group, such as —$NR_2$, —NHR, or —$NH_2$, wherein the R groups are the same or different. In further particular embodiments of Formula (10), both of $R^{28}$ and $R^{29}$ are amino groups according to the following formula:

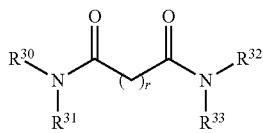

(10a)

In Formula (10a), $R^{30}$, $R^{31}$, $R^{32}$, and $R^{33}$ are independently H or any of the unsubstituted or substituted hydrocarbon groups (R) described above. In particular embodiments of Formula (10a), one, two, three, or all of $R^{30}$, $R^{31}$, $R^{32}$, and $R^{33}$ are independently selected from straight-chained or branched alkyl groups having at least two, three, four, five, six, seven, eight, nine, ten, eleven, or twelve carbon atoms, or a number of carbon atoms within a range of these numbers.

In further particular embodiments of Formula (10a), the extractant molecule is a diglycolamide having a structure according to the following general formula:

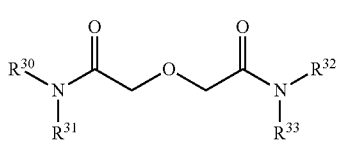

(10b)

In particular embodiments of Formula (10b), $R^{30}$, $R^{31}$, $R^{32}$, and $R^{33}$ are independently selected from methyl, ethyl, n-propyl, isopropyl, n-butyl, isobutyl, sec-butyl, t-butyl, n-pentyl, isopentyl, neopentyl, n-hexyl, isohexyl, n-heptyl, isoheptyl, n-octyl, isooctyl, n-nonyl, isononyl, n-decyl, isodecyl, n-undecyl, n-dodecyl, cyclopropyl, cyclobutyl, cyclopentyl, cyclohexyl, cycloheptyl, cyclooctyl, vinyl, allyl, phenyl, benzyl, tolyl, xylyl, and naphthyl groups. In some embodiments, $R^{30}$, $R^{31}$, $R^{32}$, and $R^{33}$ all have the same carbon number, or are all the same group. In some embodiments, $R^{30}$ and $R^{31}$, and/or $R^{32}$ and $R^{33}$ are interconnected to form a diglycolamide having one or two nitrogen-containing heterocyclic rings. A particular example of an extractant molecule according to Formula (10b) is N,N,N',N'-tetraoctyldiglycolamide (TODGA), i.e., wherein $R^{30}$, $R^{31}$, $R^{32}$, and $R^{33}$ are each octyl ($C_8H_{17}$) groups.

The linker subtended by r in Formula (10) may alternatively include or be replaced with a linking carbocyclic or heterocyclic ring. The carbocyclic ring may be, for example, a cyclohexyl, cyclohexenyl, phenyl, or naphthyl ring. The heterocyclic ring may be, for example, a pyridyl, pyrrolyl, piperidinyl, pyranyl, or furanyl ring. When a heterocyclic ring is directly bound to the two shown carbonyl groups in Formula (10), in particular embodiments, the two carbonyl groups are bound in ortho positions of the heterocyclic ring. In particular embodiments, when the heterocyclic ring is a pyridine ring, the extractant molecule can have a structure of the following formula:

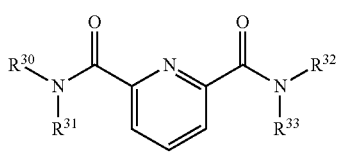

(10c)

In a second set of embodiments, the extractant molecule has a phosphoric acid or phosphate structure according to the following general formula:

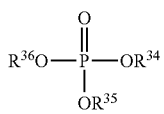

(11)

In Formula (11), $R^{34}$, $R^{35}$, and $R^{36}$ are independently H or any of the unsubstituted or substituted hydrocarbon groups (R) described above, provided that at least one of $R^{34}$, $R^{35}$, and $R^{36}$ is a hydrocarbon group (R). In particular embodiments of Formula (11), one, two, or all of $R^{34}$, $R^{35}$, and $R^{36}$ are independently selected from straight-chained or branched alkyl groups having at least two, three, four, five, six, seven, eight, nine, ten, eleven, or twelve carbon atoms, or a number of carbon atoms within a range of these numbers. In a first set of embodiments of Formula (11), one of $R^{34}$, $R^{35}$, and $R^{36}$ is a hydrocarbon group (R) while two of $R^{34}$, $R^{35}$, and $R^{36}$ are hydrogen atoms. Some examples of such compounds include monoethylphosphoric acid, monoisopropylphosphoric acid, mono(n-butyl)phosphoric acid, monoisobutylphosphoric acid, monoisopentylphosphoric acid, mononeopentylphosphoric acid, and mono(2-ethylhexyl)phosphoric acid (H2MEHP). In a second set of embodiments of Formula (11), two of $R^{34}$, $R^{35}$, and $R^{36}$ are independently selected from hydrocarbon groups (R) while one of $R^{34}$, $R^{35}$, and $R^{36}$ is a hydrogen atom. Some examples of such compounds include diethylphosphoric acid, diisopropylphosphoric acid, di(n-butyl)phosphoric acid, diisobutylphosphoric acid, diisopentylphosphoric acid, di(neopentyl)phosphoric acid, dioctylphosphoric acid, and di(2-ethylhexyl)phosphoric acid (HDEHP). In a third set of embodiments of Formula (11), all three of $R^{34}$, $R^{35}$, and $R^{36}$ are independently selected from hydrocarbon groups (R). Some examples of such compounds include triethylphosphate, triisopropylphosphate, tri(n-butyl)phosphate, triisobutylphosphate, triisopentylphosphate, tri(neopentyl)phosphate, trioctylphosphate, tricresylphosphate, dicresylphenylphosphate, and tris(2-ethylhexyl)phosphate (TEHP).

In a third set of embodiments, the extractant molecule has an amide structure according to the following general formula:

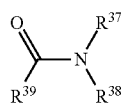

(12)

In Formula (12), $R^{37}$, $R^{38}$, and $R^{39}$ are independently H or any of the unsubstituted or substituted hydrocarbon groups (R) described above, provided that at least one of $R^{37}$, $R^{38}$, and $R^{39}$ is a hydrocarbon group (R). Typically, at least $R^{39}$ is a hydrocarbon group (R), and more typically, at least $R^{39}$ and at least one or both of $R^{37}$ and $R^{38}$ are hydrocarbon groups (R). In particular embodiments of Formula (12), one, two, or all of $R^{37}$, $R^{38}$, and $R^{39}$ are independently selected from straight-chained or branched alkyl groups having at least two, three, four, five, six, seven, eight, nine, ten, eleven, or twelve carbon atoms, or a number of carbon atoms within a range of these numbers. In a first set of embodiments of Formula (12), one of $R^{37}$, $R^{38}$, and $R^{39}$ is a hydrocarbon group (R) while two of $R^{37}$, $R^{38}$, and $R^{39}$ are hydrogen atoms. In a second set of embodiments of Formula (12), two of $R^{37}$, $R^{38}$, and $R^{39}$ are independently selected from hydrocarbon groups (R) while one of $R^{37}$, $R^{38}$, and $R^{39}$ is a hydrogen atom. In a third set of embodiments of Formula (12), all three of $R^{37}$, $R^{38}$, and $R^{39}$ are independently selected from hydrocarbon groups (R). Some examples of compounds of Formula (12) include N,N-di-(2-ethylhexyl)-3-methylbutanamide, N,N-di-(2-ethylhexyl)-2-methylpropanamide, N,N-di-(2-ethylhexyl)-2,2-dimethylpropanamide, and N,N-di-(2-ethylhexyl)-2-ethylhexanamide.

In different embodiments, the non-ionic liquid (such as extractant molecule) may be included in an amount of precisely, at least, or less than, for example, 0.1 wt %, 0.5 wt %, 1 wt %, 2 wt %, 5 wt %, 10 wt %, 15 wt %, 20 wt %, 25 wt %, or 30 wt % by weight of the ionic liquid, or by weight of the aqueous substrate, or by combined weight of ionic liquid and aqueous substrate. In other embodiments, the non-ionic liquid may be included in an amount of precisely, at least, or less than, for example, 0.1 mM, 0.2 mM, 0.5 mM, 1 mM, 1.5 mM, 2 mM, 2.5 mM, 3 mM, 3.5 mM, 4 mM, 5 mM, 10 mM, 15 mM, 20 mM, 25 mM, 30 mM, 40 mM, 50 mM, 100 mM, 150 mM, 200 mM, 250 mM, 300 mM, 400 mM, or 500 mM, or an amount within a range bounded by any two of the foregoing values.

In some embodiments, one or more of any of the foregoing general classes or specific types of non-ionic liquids (such as extractant and/or surfactant molecules) are excluded. In some embodiments, it may be preferable to include a non-ionic liquid that is soluble in the ionic liquid or aqueous substrate. In particular embodiments, non-ionic liquids are not present, i.e., excluded from either the ionic liquid, aqueous substrate, or both. In other embodiments, any chemical entity that binds, complexes, or chelates to a metal or the radioisotope to be extracted is excluded from the method described herein.

In other embodiments, an exchange resin, such as an organic or inorganic, synthetic or natural, cationic or anionic exchange resin known in the art, is excluded from the process described herein. The inorganic exchange resin excluded herein can be, for example, a hydrous oxide or an acidic salt of multivalent metals, salts of heteropolyacids, insoluble ferrocyanides, aluminosilicates, and similar compositions. The organic exchange resin excluded herein can be, for example, any of the strongly acidic, intermediate acidic, weakly acidic, strongly basic, intermediate basic, or weakly basic exchange resins known in the art.

Examples have been set forth below for the purpose of illustration and to describe certain specific embodiments of the invention. However, the scope of this invention is not to be in any way limited by the examples set forth herein.

EXAMPLE 1

Preparation of Ionic Liquids

Some of the ionic liquids (ILs) particularly considered in the instant invention are composed of imidazolium, bicyclic-imidazolium, and pyridinium cations with fluorinated anions, such as those depicted in FIG. 1. Initial characterization and testing have been performed on several of these ionic liquids. Synthesis of bicyclic ionic liquid [BuI5][NTf$_2$].

The bicyclic ionic liquid was synthesized according to a modified literature procedure (Kan, H. C., et al., "Bicyclic imidazolium-based ionic liquids: synthesis and characterization," *Tetrahedron*, 63, p. 1644-1653, 2007). Hydrogen chloride gas was slowly bubbled though a flask containing 4-chlorobutyronitrile (20 mL, 200 mmoles) and methanol (15 mL, 2.5 equivalents) dissolved in diethyl ether (100 mL) for 4 hours. The solution was then placed in a freezer for 24 hours. The white precipitate was filtered and dried to give the intermediate, 3-chloropropanimidate hydrochloride in 40% yield.

To the solution of 3-chloropropanimidate hydrochloride (13.2183 g, 76.84 mmol) in dichloromethane (75 mL) were added aminoacetaldehyde dimethyl acetal (6.75 mL, 61.2 mmol) and triethylamine (32.14 mL, 232 mmol). The solution was heated to reflux for 2 hours and then cooled to room temperature (typically 18-30° C., or about 25° C.). The solvent and excess triethylamine were removed in vacuo to produce the desired amidine product was used in the next step without further purification.

A solution of the crude amidine in formic acid (40 mL) was heated to reflux for 2 hours. After cooling, the solution was made basic by the careful addition of aqueous potassium hydroxide. The aqueous phase was extracted with dichloromethane. The combined organic phases were dried, and the solvent removed by rotary evaporation to yield a dark red solid. The crude product was purified by column chromatography (20/1-dichloromethane/ethanol on silica gel) to give the bicyclic imidazole as a yellow crystalline solid in 80.4% yield in two steps.

To the bicyclic imidazole, 1-bromobutane (1.1 equiv) was added. The neat solution was heated to 80° C. for 2 hours. After cooling, excess bromobutane was removed from the resulting ionic liquid in vacuo. The product was then dissolved in water and washed three times with ethyl acetate. To the aqueous phase was added 1 equivalent of lithium bis(trifluoromethanesulfonyl)imide (LiNTf$_2$). The phases were separated and the ionic liquid phase dried under vacuum.

Synthesis of pyridinium-based ILs [PhCH$_2$Py][][NTf$_2$]

To benzylbromide (2.3145 g, 0.0135 mol), was added pyridine (1.07 g, 0.0135 mol) dropwise at room temperature. The mixture became cloudy and some heat was released while the pyridine was added. The reaction mixture turned to a yellow clear gel when the addition was completed and the system cooled down to room temperature. The gel was then dissolved in D. I. water. To this aqueous solution was added lithium bis(trifluoromethanesulfonyl)imide (LiNTf$_2$, 3.875 g, 0.0135 mol). The phases were separated and the lower layer (IL) was separated from the aqueous phase and washed with D.I. water four times to ensure the removal of LiBr. The final product, a nearly colorless free-flowing liquid, was dried under vacuum at 70° C. for 4 hours. 5.39 g (0.031 mol) of [PhCH$_2$Py][NTf$_2$] was obtained (overall yield 89%). $^1$H-NMR data: δ, 8.78 (m, 2H), 8.39 (s, 1H), 7.90 (m, 2H), 7.38 (m, 5H), and 5.78 (s, 2H). $^{13}$C-NMR: δ, 145.95 (CH), 144.10 (CH), 131.81 (C), 130.59 (CH), 129.75 (CH), 128.65 (CH), 128.32 (CH), 119.74 (CF$_3$, q, J$_{C-F}$=321.0 Hz), and 65.29 (CH$_2$).

Density and Viscosity Measurements of Ionic Liquids Used

The density and viscosity of several ionic liquids used in the instant experiments are given in Table 1 below.

TABLE 1

Density and viscosity of ionic liquids

| Ionic Liquid | Density (g/cc) 25° C. | Viscosity (cP) 25° C. | 40° C. | 100° C. |
|---|---|---|---|---|
| [C$_4$mim][NTf$_2$] | 1.420 | 50.72 | 25.30 | 5.849 |
| [BuI5][NTf$_2$] | 1.444 | 95.75 | 44.04 | 7.790 |
| [BuI6][NTf$_2$] | 1.495 | 157.5 | 64.79 | 9.44 |
| [PhCH$_2$Py][NTf$_2$] | 1.425 | 84.16 | 35.72 | NM* |
| [PhCH$_2$Py-o-Me][NTf$_2$] | 1.407 | 174.5 | 70.08 | NM |
| [PhCH$_2$Py-m-Me][NTf$_2$] | 1.440 | 160.7 | 58.14 | NM |
| [PhCH$_2$Py-p-Me][NTf$_2$] | 1.423 | 132.2 | 54.56 | NM |

NM*: not measured.

Figure 2:
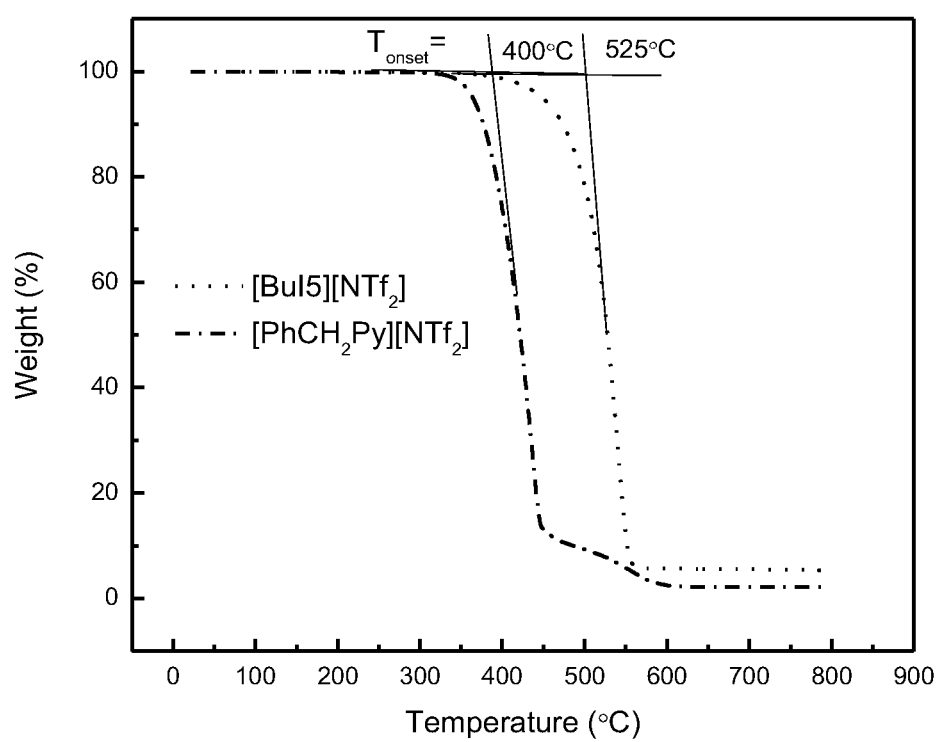
FIG. 2. Thermogravimetric analysis (TGA) graphs of [BuI5][NTf$_2$] and [PhCH$_2$Py][NTf$_2$] ionic liquids.

Thermogravimetric Analysis of [BuI5][NTf$_2$] and [PhCH$_2$Py][NTf$_2$] Ionic Liquids Thermogravimetric analysis (TGA) was conducted on [BuI5][NTf$_2$] and [PhCH$_2$Py][NTf$_2$] from room temperature to 800° C. at a heating rate of 10° C./min under N$_2$ atmosphere. The TGA curves are shown in FIG. 2. As shown, the onset decomposition temperatures are 525 and 400° C. for [BuI5][NTf$_2$] and [PhCH$_2$Py][NTf$_2$], respectively. Both are more thermally stable than most available ILs. In particular, the thermal stability of [BuI5][NTf$_2$] is more than 100° C. higher than that of typical ILs. Thus, the class of bicyclic ionic liquids of which [BuI5][NTf$_2$] is exemplary, and other high temperature ILs, are particularly considered herein.

EXAMPLE 2

Extraction Experiments

The extraction experiments were performed for each IL by contacting 0.05 mL of IL containing various concentrations of the extractant with 0.5 mL of aqueous solution containing Th-227/Ac-225 for 60 minutes in a vibrating mixer. After centrifugation and standing overnight, the upper aqueous phase was separated, and waited for 30 minutes to allow Fr-221 (218 keV) to grow in. The radioactivities of Th-227/Ac-225 in both phases were determined by gamma spectrometry. Th-227 was determined at 235 keV and Ac-225 was determined as Fr-221 at 218 keV.

The distribution coefficients (D$_M$) for extraction of M$^{n+}$, and extraction efficiency (E %) are defined by the following equations:

$$D_M = \left\{ \frac{(R(IL))}{(R(AQ))} \right\} \times \frac{\{\text{Volume of aqueous solution}\}}{\{\text{Volume of } IL\}}$$

$$E\% = R(IL)/[R(IL)+R(AQ)]$$

In the above formulas, R(IL) and R(AQ) represent the final radioactivities of M$^{n+}$ in the ionic liquid and aqueous phase, respectively. Although the value of D$_M$ depends on the concentration of free extractants, the extraction trend reflected in D$_M$ should be the same as that of the corresponding equilibrium constant for a given initial extractant concentration. A volume ratio is needed in the calculation of distribution coefficients to account for the difference in volume between the two phases.

EXAMPLE 3

Separation of Th-227 and Ac-225

Separation of Th-227 and Ac-225 Using TODGA as Extractant

Figure 3:
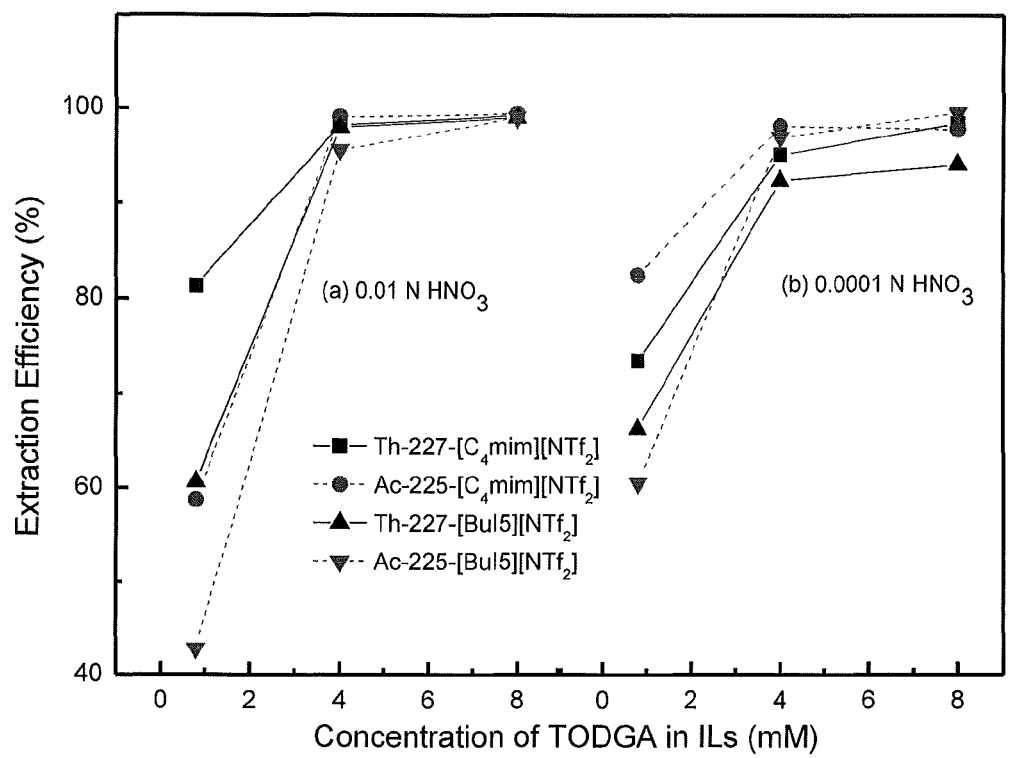
FIG. 3. Graph plotting extraction efficiency (%) vs. concentration of TODGA extractant on Th-227/Ac-225 separation for different types of ionic liquids.

Solvent extraction experiments with radioactive Th-227/Ac-225 were conducted using two ionic liquids [C$_4$mim][NTf$_2$], [BuI5][NTf$_2$] containing different concentrations (0.8 mM, 4.0 mM, and 8.0 mM) of extractant (TODGA) at two different acidities (0.01 N HNO$_3$, and 0.0001 N HNO$_3$). The results are summarized in the plot shown in FIG. 3. As shown by FIG. 3, at these acidities, the extraction efficiency for Th-227 and Ac-225 increased quickly as the concentration of TODGA increased. When the aqueous phase was made less acidic (in 0.0001 N HNO$_3$), the extraction of Ac-225 from aqueous (AQ) phase to ionic liquid (IL) phase was somewhat more efficient than that of Th-227 at higher concentration of TODGA. These experiments demonstrate that TODGA offered good extraction for both Th-227 and Ac-225 but very little separation of Th-227 from Ac-225 for both ILs at these acidities. Therefore, another extractant, HDEHP, was investigated, as further discussed below.

Separation of Th-227 and Ac-225 Using HDEHP as Extractant

Solvent extraction experiments with radioactive Th-227 and Ac-225 were performed under four different acidities in four ILs with HDEHP as an extractant. The extraction results under the same 10:1 volume ratio of four ionic liquids containing 4.0 mM of HDEHP in ILs are summarized in Table 2 below.

TABLE 2

Distribution coefficients and extraction efficiencies of Th-227/Ac-225 in four ILs containing 4.0 mM HDEHP

| ILs | [HNO$_3$] N | D$_{Th-227}$ | D$_{Ac-225}$ | D$_{Th-227}$/D$_{Ac-225}$ | E % Th-IL | E % Ac-IL |
|---|---|---|---|---|---|---|
| [C$_4$mim][NTf$_2$] | 0.1 | 15.4 | 1.32E−3 | 1.16E+4 | 60.62 | 0.01 |
|  | 0.01 | 7.84E+4 | 1.35E−3 | 5.83E+7 | 99.99 | 0.01 |
|  | 0.001 | 2.29E+4 | 24.7 | 9.26E+2 | 99.96 | 71.15 |
|  | 0.0001 | 5.48E+4 | 98.5 | 5.56E+2 | 99.98 | 90.78 |
| [C$_4$mim][BETI] | 0.1 | 148 | 1.29E−3 | 1.14E+5 | 93.67 | 0.01 |
|  | 0.01 | 7.79E+4 | 1.35E−3 | 5.73E+7 | 99.99 | 0.01 |
|  | 0.001 | 2.37E+4 | 62.0 | 3.82E+2 | 99.96 | 86.10 |
|  | 0.0001 | 5.85E+4 | 80.7 | 7.25E+2 | 99.98 | 88.97 |
| [BuI5][NTf$_2$] | 0.1 | 7.95E+4 | 2.51E−2 | 3.17E+6 | 99.99 | 0.25 |
|  | 0.01 | 133 | 85.8 | 1.55 | 93.00 | 89.56 |
|  | 0.001 | 2.52E+2 | 14.7 | 171 | 99.60 | 93.62 |
|  | 0.0001 | 6.64E+4 | 4.33E+3 | 15.3 | 99.98 | 99.77 |
| [PhCH$_2$Py][NTf$_2$] | 0.1 | 29.7 | 1.30E−3 | 2.28E+5 | 74.84 | 0.01 |
|  | 0.01 | 3.63E+3 | 1.34E−3 | 2.71E+6 | 99.72 | 0.01 |
|  | 0.001 | 2.33E+4 | 2.70E−1 | 8.63E+4 | 99.96 | 2.63 |
|  | 0.0001 | 6.00E+4 | 9.13E−1 | 6.57E+4 | 99.98 | 8.37 |

The designation "E" shown above in Table 2 indicates base 10, with the succeeding number as exponent. As shown in Table 2, all four ionic liquids provided a high extraction efficiency for Th-227 at four acidities. Lower acidities offered better extractions of Ac-225 from the AQ phase into the IL phase. At 0.1 N and 0.01 N acidities, most Ac-225 remained in the AQ phase for three ILs except [BuI5][NTf$_2$], which extracted both Th-227 and Ac-225 at 0.01, 0.001, and 0.0001 N acidities. The best ionic liquid of the four ILs investigated here at a concentration of 4.0 mM HDEHP for Th-227/Ac-225 separation was found to be [PhCH$_2$Py][NTf$_2$], which offered good separation at all four acidities. These results demonstrate that ionic liquids are excellent solvents for HDEHP and related extractants for a clean separation of Th-227 from Ac-225 in radioisotope production.

Effect of Acidity of Aqueous Phase on Th-227/Ac-225 Separation

Figure 4:
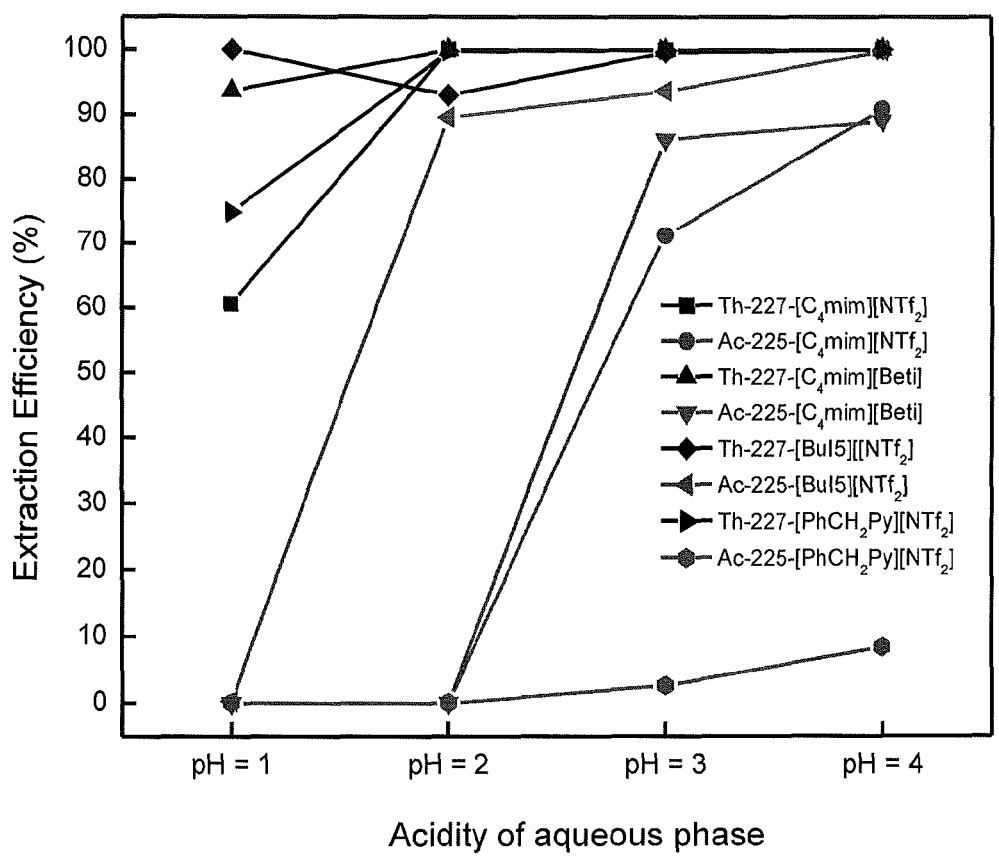
FIG. 4. Graph plotting extraction efficiency (%) vs. acidity of the aqueous phase on Th-227/Ac-225 separation for different types of ionic liquids.

FIG. 4 is a graph plotting extraction efficiency (%) vs. acidity of the aqueous phase on Th-227/Ac-225 separation for different types of ionic liquids. As illustrated by the plot shown in FIG. 4, when the AQ phase was most acidic (0.1 N HNO$_3$), extraction of Th-227 from AQ phase into the IL phase was more than 60%, and extraction of Ac-225 was less than 1% for all four ILs. The best IL for Th-227/Ac-225 separation at 0.1 N HNO$_3$ was found to be [BuI5][NTf$_2$], which extracted 99.99% of Th-227 and only 0.25% Ac-225 into the IL phase, and the separation factor was as high as 106. When the AQ phase became less acidic (0.01 N HNO$_3$), extraction of Th-227 from the AQ phase into the IL phase was more than 99%, and extraction of Ac-225 was less than 0.1% for [C$_4$mim][NTf$_2$], [C$_4$mim][BETI], and [PhCH$_2$Py][NTf$_2$]. All three ILs provided a separation factor for Th-227/Ac-225 as high as 106 at this acidity. Similar to the extraction system using TODGA, as the AQ phase became less acidic, more Ac-225 was extracted into the IL phase. At 0.001 N and 0.0001 N HNO$_3$, [PhCH$_2$Py][NTf$_2$] provided a particularly improved Th-227/Ac-225 separation. The separation factor still reached a value as high as 10$^4$.

Effect of HDEHP Concentration on Extraction Efficiencies and Selectivities of Th-227/Ac-225

Another set of experiments was performed by varying the concentrations of HDEHP in [C$_4$mim][NTf$_2$]. The results are summarized in Table 3 below. In 0.1 N HNO$_3$, as the HDEHP concentrations increased, the D$_{Th-227}$ value increased while D$_{Ac-225}$ value remained negligible. Therefore, as the HDEHP concentrations increased, the separation factor (D$_{Th-227}$/D$_{Ac-225}$) increased. In 0.01 N HNO$_3$, as the HDEHP concentrations increased, the D$_{Ac-225}$ values increased while D$_{Th-227}$ remained similarly high, resulting in the decrease of the separation factor (D$_{Th-227}$/D$_{Ac-}$225) as the HDEHP concentrations increased. In 0.001 N HNO$_3$, both D$_{Th-227}$ and D$_{Ac-225}$ values increased as the HDEHP concentrations increased. Moreover, the D$_{Ac-225}$ value increased drastically from 110 to 141000 as the HDEHP concentration increased from 1 mM to 2 mM. The separation factor (D$_{Th-227}$/D$_{Ac-225}$) decreased sharply from 521 to 0.449 when the HDEHP concentrations increased from 1 mM to 2 mM, then remained around 0.4 for all three other concentrations. When the aqueous phase was the least acidic (0.0001 N HNO$_3$), both Th-227 and Ac-225 could be quantitatively extracted from the AQ phase into the IL phase except that the D$_{Ac-225}$ value was 116 at 1 mM HDEHP concentrations. Again, the D$_{Ac-225}$ value increased drastically from 116 to 187000 as the HDEHP concentration increased from 1 mM to 2 mM. Therefore, the separation factor (D$_{Th-227}$/D$_{Ac-225}$) decreased again sharply from 2140 to 1.47 when the HDEHP concentrations increased from 1 mM to 2 mM, then remained around 1.5 for all three more concentrated solutions.

TABLE 3

Distribution coefficients and extraction efficiencies of Th-227/Ac-225 in [C$_4$mim][NTf$_2$] containing different concentrations of HDEHP

| Acidities of AQ | Concentration of HDEHP (mM) | D$_{Th-227}$ | D$_{Ac-225}$ | D$_{Th-227}$/D$_{Ac-225}$ | E % Th-IL | E % Ac-IL |
|---|---|---|---|---|---|---|
| 0.1N HNO$_3$ | 1 | 10.1 | 6.33E−4 | 1.60E+4 | 30.31 | 0.01 |
|  | 2 | 28.9 | 6.29E−4 | 4.60E+4 | 74.31 | 0.01 |

TABLE 3-continued

Distribution coefficients and extraction efficiencies of Th-227/Ac-225 in [C$_4$mim][NTf$_2$] containing different concentrations of HDEHP

| Acidities of AQ | Concentration of HDEHP (mM) | $D_{Th\text{-}227}$ | $D_{Ac\text{-}225}$ | $D_{Th\text{-}227}/D_{Ac\text{-}225}$ | E % Th-IL | E % Ac-IL |
|---|---|---|---|---|---|---|
| | 3 | 41.4 | 6.54E−4 | 6.34E+4 | 80.56 | 0.01 |
| | 4 | 132 | 1.17E−3 | 1.13E+5 | 92.95 | 0.01 |
| 0.01N HNO$_3$ | 1 | 4.15E+4 | 9.60 | 4.32E+3 | 99.98 | 48.99 |
| | 2 | 4.17E+4 | 15.8 | 2.64E+3 | 99.98 | 61.22 |
| | 3 | 3.99E+4 | 21.2 | 1.88E+3 | 99.97 | 68.00 |
| | 4 | 4.24E+4 | 23.2 | 1.83E+3 | 99.98 | 71.63 |
| 0.001N HNO$_3$ | 1 | 5.72E+4 | 110 | 521 | 99.98 | 91.65 |
| | 2 | 6.33E+4 | 1.41E+5 | 0.449 | 99.98 | 99.99 |
| | 3 | 6.72E+4 | 1.55E+5 | 0.434 | 99.99 | 99.99 |
| | 4 | 1.61E+5 | 3.90E+5 | 0.413 | 99.98 | 99.99 |
| 0.0001N HNO$_3$ | 1 | 2.47E+4 | 116 | 2.14E+3 | 100 | 92.04 |
| | 2 | 2.74E+4 | 1.87E+5 | 1.47 | 100 | 99.99 |
| | 3 | 2.58E+4 | 1.78E+5 | 1.45 | 100 | 99.99 |
| | 4 | 2.79E+4 | 1.85E+5 | 1.51 | 100 | 99.99 |

Separation of Th-227 and Ac-225 with Neat Ionic Liquids

Solvent extraction experiments with radioactive Th-227 and Ac-225 were performed under four different acidities in neat ILs without any extractant. The extraction results are summarized in Table 4 below. Surprisingly, as shown by Table 4, the $D_{Th}$ values can reach as high as 8000 or over for some ILs at lower acidities and $D_{Ac}$ values can still be kept at less than one. This demonstrates the unexpected finding that a clean separation of Th-227/Ac-225 using neat ILs is feasible.

TABLE 4

Distribution coefficients and extraction efficiencies of Th-227/Ac-225 in neat ILs

| ILs | [HNO$_3$] N | $D_{Th\text{-}227}$ | $D_{Ac\text{-}225}$ | $D_{Th\text{-}227}/D_{Ac\text{-}225}$ | E % Th-IL | E % Ac-IL |
|---|---|---|---|---|---|---|
| [C$_4$mim][NTf$_2$] | 0.1 | 0.0347 | 0.0186 | 1.86 | 0.35 | 0.19 |
| | 0.01 | 0.186 | 0.0163 | 11.4 | 1.83 | 0.16 |
| | 0.001 | 2.21 | 0.0774 | 28.6 | 19.13 | 0.77 |
| | 0.0001 | 7430 | 0.339 | 21900 | 99.87 | 3.27 |
| [C$_4$mim][BETI] | 0.1 | 0.0884 | 0.030 | 2.95 | 0.88 | 0.30 |
| | 0.01 | 0.947 | 0.0265 | 35.7 | 8.65 | 0.26 |
| | 0.001 | 4.44 | 0.0399 | 111 | 30.74 | 6.20 |
| | 0.0001 | 8590 | 0.661 | 13000 | 99.88 | 6.20 |
| [BuI5][NTf$_2$] | 0.1 | 0.461 | 5.77E−3 | 79.9 | 4.41 | 0.06 |
| | 0.01 | 2.80 | 0.0126 | 222 | 21.85 | 0.13 |
| | 0.001 | 17.3 | 0.0438 | 396 | 63.38 | 0.44 |
| | 0.0001 | 1130 | 0.363 | 3110 | 99.12 | 3.50 |
| [PhCH$_2$Py][NTf$_2$] | 0.1 | 2.6 | 9.71E−4 | 2680 | 20.65 | 0.01 |
| | 0.01 | 15.2 | 7.25E−4 | 21000 | 60.31 | 0.01 |
| | 0.001 | 41.9 | 0.0275 | 1520 | 80.73 | 0.27 |
| | 0.0001 | 7980 | 0.126 | 63400 | 99.87 | 1.24 |
| [PhCH$_2$Py][BETI] | 0.1 | 5.38 | 0.0394 | 136 | 34.98 | 0.39 |
| | 0.01 | 31.2 | 0.0794 | 392 | 75.71 | 0.79 |
| | 0.001 | 50.0 | 0.0122 | 4100 | 83.41 | 0.12 |
| | 0.0001 | 235 | 0.0242 | 9710 | 95.96 | 0.24 |
| [BuPy][NTf$_2$] | 0.1 | 0.0421 | 0.00381 | 11.1 | 0.42 | 0.04 |
| | 0.01 | 3.49 | 0.00167 | 2080 | 25.85 | 0.02 |
| | 0.001 | 10.7 | 0.390 | 34.6 | 51.61 | 2.99 |
| | 0.0001 | 601 | 0.505 | 1190 | 98.36 | 4.81 |

The Th-227/Ac-225 system was selected in the above examples for demonstration purposes and for the sake of convenience since these isotopes have short half-lives (i.e., $t_{1/2}$ of 18 and 10 days, respectively). However, there is generally no Th-227/Ac-225 pair in a routine isotope production system. The production system is generally Th-229/Ac-225 or Ac-227/Th-227. Thus, the above-described research can be extended to the separation of other isotope pairs, including, for example, Th from Ac (Th-229/Ac-225, Ac-227/Th-227); Ra from Ac (Ac-225 and Ra-225, Ac-227 and Ra-223); or Ra from Th (Th-227 and Ra-223, Th-229 and Ra-225).

While there have been shown and described what are at present considered the preferred embodiments of the invention, those skilled in the art may make various changes and modifications which remain within the scope of the invention defined by the appended claims.

What is claimed is:

1. A method for extracting a radioisotope from an aqueous solution, the method comprising: a) intimately mixing a non-chelating ionic liquid with the aqueous solution to transfer at least a portion of said radioisotope to said non-chelating ionic liquid; and b) separating the non-chelating ionic liquid from the aqueous solution, wherein a crown ether is excluded from the non-chelating ionic liquid and aqueous solution.

2. The method of claim 1, wherein the method achieves an extraction efficiency of at least 80%, wherein the extraction efficiency is calculated as $R_{IL}/(R_{IL}+R_{aq})$, wherein $R_{IL}$ represents a final radioactivity of the radioisotope in the ionic liquid, and $R_{aq}$ represents a final radioactivity of the radioisotope in the aqueous solution in the same units of radioactivity, wherein the final radioactivity is the radioactivity measured after steps (a) and (b) are completed.

3. The method of claim 2, wherein the method achieves an extraction efficiency of at least 90%.

4. The method of claim 1, wherein said aqueous solution contains more than one radioisotope.

5. The method of claim 4, wherein said method substantially separates a first radioisotope from a second radioisotope by disproportionately extracting the first radioisotope over the second radioisotope.

6. The method of claim 5, wherein said method achieves a separation factor of at least $1\times10^4$ wherein the separation factor is calculated as $D_1/D_2$ wherein $D_1$ is a distribution coefficient for the first radioisotope and $D_2$ is a distribution coefficient for the second radioisotope, wherein the distribution coefficient is calculated by the general formula $R_{IL}/R_{aq} \times Vol_{aq}/Vol_{IL}$, wherein $R_{IL}$ represents a final radioactivity of the radioisotope in the ionic liquid, $R_{aq}$ represents a final radioactivity of the radioisotope in the aqueous solution in the same units of radioactivity, $Vol_{IL}$ represents a volume of the ionic liquid, and $Vol_{aq}$ represents a volume of the aqueous solution.

7. The method of claim 6, wherein said method achieves a separation factor of at least $1\times10^5$.

8. The method of claim 1, wherein the non-chelating ionic liquid is admixed with an extractant molecule that is non-polymeric and not an ionic liquid, wherein said extractant molecule binds to the radioisotope to facilitate its extraction or facilitate its separation from another radioisotope.

9. The method of claim 1, wherein the non-chelating ionic liquid is not admixed with a chemical entity that binds to the radioisotope.

10. The method of claim 6, wherein prior to or during the extraction process, the aqueous solution is acidified to a pH less than 7 to achieve said separation factor of at least $1\times10^4$.

11. The method of claim 10, wherein said method achieves a separation factor of at least $1\times10^5$.

12. The method of claim 1, wherein the non-chelating ionic liquid possesses an ammonium, phosphonium, or sulfonium cation portion.

13. The method of claim 1, wherein the non-chelating ionic liquid possesses an ammonium cation portion.

14. The method of claim 13, wherein the ammonium cation portion is comprised of a heterocyclic ring having a positively-charged ring nitrogen.

15. The method of claim 14, wherein the heterocyclic ring is selected from the group consisting of imidazolium, benzimidazolium, pyridinium, pyrazinium, pyrrolidinium, piperidinium, piperazinium, morpholinium, pyrrolium, pyrazolium, pyrimidinium, triazolium, oxazolium, thiazolium, triazinium, indolium, quinolinium, quinazolinium, pyrrolo[1,2-a] pyrimidinium, and cyclic guanidinium rings.

16. The method of claim 13, wherein the ammonium cation portion is a quaternary ammonium group.

17. The method of claim 16, wherein the quaternary ammonium group is a tetraalkylammonium group.

18. The method of claim 1, wherein the non-chelating ionic liquid possesses an anionic portion having a composition according to the chemical formula:

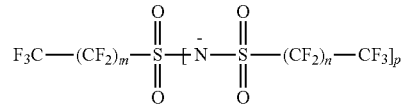

wherein m and n are independently 0 or an integer of 1 or above, and p is 0 or 1, provided that when p is 0, the group $-N-SO_2-(CF_2)_nCF_3$ subtended by p is replaced with an oxide atom connected to the sulfur atom, and when p is 1, the shown perfluoroalkyl groups can optionally crosslink to form a cyclic anion.

19. The method of claim 18, wherein the anionic portion has a composition according to the chemical formula:

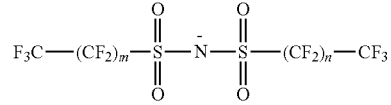

wherein m and n are independently 0 or an integer of 1 or above.

20. The method of claim 18, wherein the anionic portion has a composition according to the chemical formula:

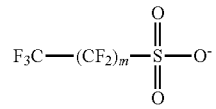

wherein m is 0 or an integer of at least 1.

21. The method of claim 1, wherein the non-chelating ionic liquid possesses an anionic portion that contains at least one anionic group selected from the group consisting of carboxylate and sulfonate groups.

22. The method of claim 1, wherein the radioisotope has an atomic number above 80.

23. The method of claim 22, wherein the radioisotope is selected from at least one of the group consisting of thorium, actinium, bismuth, and radium.

24. The method of claim 22, wherein the radioisotope is selected from at least one of the group consisting of thorium and actinium.

25. The method of claim 5, wherein the method substantially separates thorium from actinium.

26. A method for separating a first radioisotope from a second radioisotope in an aqueous solution containing more than one radioisotope, the method comprising: a) intimately mixing a non-chelating ionic liquid with the aqueous solution to disproportionately extract the first radioisotope over the second radioisotope into said non-chelating ionic liquid; and b) separating the non-chelating ionic liquid from the aqueous solution to result in a substantial separation of said first radioisotope from said second radioisotope.

27. The method of claim 26, wherein said method achieves a separation factor of at least $1\times10^4$ wherein the separation factor is calculated as $D_1/D_2$ wherein $D_1$ is a distribution coefficient for the first radioisotope and $D_2$ is a distribution coefficient for the second radioisotope, wherein the distribution coefficient is calculated by the general formula $R_{IL}/R_{aq} \times Vol_{aq}/Vol_{IL}$, wherein $R_{IL}$ represents a final radioactivity of the radioisotope in the ionic liquid, $R_{aq}$ represents a final radioactivity of the radioisotope in the aqueous solution in the same units of radioactivity, $Vol_{IL}$ represents a volume of the ionic liquid, and $Vol_{aq}$ represents a volume of the aqueous solution.

28. The method of claim 27, wherein prior to or during the extraction process, the aqueous solution is acidified to a pH less than 7 to achieve said separation factor of at least $1 \times 10^4$.

29. A method for extracting a radioisotope from an aqueous solution, the method comprising: a) intimately mixing a non-chelating ionic liquid with the aqueous solution to transfer at least a portion of said radioisotope to said non-chelating ionic liquid; and b) separating the non-chelating ionic liquid from the aqueous solution, wherein the non-chelating ionic liquid possesses an ammonium, phosphonium, or sulfonium cation portion.

30. A method for extracting a radioisotope from an aqueous solution, the method comprising: a) intimately mixing a non-chelating ionic liquid with the aqueous solution to transfer at least a portion of said radioisotope to said non-chelating ionic liquid; and b) separating the non-chelating ionic liquid from the aqueous solution, wherein the non-chelating ionic liquid possesses an anionic portion that contains at least one anionic group selected from the group consisting of carboxylate and sulfonate groups.

31. A method for extracting a radioisotope from an aqueous solution, the method comprising: a) intimately mixing a non-chelating ionic liquid with the aqueous solution to transfer at least a portion of said radioisotope to said non-chelating ionic liquid; and b) separating the non-chelating ionic liquid from the aqueous solution, wherein the radioisotope has an atomic number above 80.

* * * * *